United States Patent

Li

[11] Patent Number: 6,141,353
[45] Date of Patent: Oct. 31, 2000

[54] SUBSEQUENT FRAME VARIABLE DATA RATE INDICATION METHOD FOR VARIOUS VARIABLE DATA RATE SYSTEMS

[75] Inventor: Kaiping Li, Lawrenceville, Ga.

[73] Assignee: Oki Telecom, Inc., Suwanee, Ga.

[21] Appl. No.: 08/813,537

[22] Filed: Mar. 7, 1997

Related U.S. Application Data

[63] Continuation of application No. 08/474,409, Jun. 7, 1995, abandoned, which is a continuation-in-part of application No. 08/306,777, Sep. 15, 1994, Pat. No. 5,537,410.

[51] Int. Cl.⁷ ..................................................... H04T 3/22
[52] U.S. Cl. .......................... 370/465; 370/479; 375/222; 714/708
[58] Field of Search .................................... 370/252, 253, 370/310, 328, 329, 335, 351, 342, 395, 441, 442, 464, 465, 479, 389; 375/222, 200, 206, 219, 130, 140; 371/55; 714/809, 708, 701

[56] References Cited

U.S. PATENT DOCUMENTS

| | | | |
|---|---|---|---|
| 4,779,266 | 10/1988 | Chung et al. | 370/441 |
| 4,860,315 | 8/1989 | Hosoda et al. | 375/245 |
| 5,115,429 | 5/1992 | Hluchyj et al. | 370/232 |
| 5,259,003 | 11/1993 | Berger et al. | 375/260 |
| 5,341,456 | 8/1994 | DeJaco | 395/2.23 |
| 5,367,523 | 11/1994 | Chang et al. | 370/235 |
| 5,414,796 | 5/1995 | Jacobs et al. | 704/221 |
| 5,442,625 | 8/1995 | Gitlin et al. | 370/342 |
| 5,528,593 | 6/1996 | English et al. | 370/391 |
| 5,537,410 | 7/1996 | Li | 370/465 |
| 5,566,206 | 10/1996 | Butler et al. | 375/225 |
| 5,581,575 | 12/1996 | Zehavi et al. | 375/200 |
| 5,633,881 | 5/1997 | Zehavi et al. | 371/37.5 |
| 5,638,412 | 6/1997 | Blakeney, II et al. | 375/377 |
| 5,657,420 | 8/1997 | Jacobs et al. | 704/223 |
| 5,673,266 | 9/1997 | Li | 370/465 |

FOREIGN PATENT DOCUMENTS

WO 86/01357   2/1986   WIPO ............................. H04J 3/22

OTHER PUBLICATIONS

TIA/EIA Interim Standard—95, "Mobile Station–Base Station Compatibility Standard for Dual–Mode Wideband Spread Spectrum Cellular System," Sections 6–6.2.4 and 7–7.2.4—IS–95, Telecommunications Industry Association, Jul., 1993.

TIA/EIA Interim Standard—96, "Speech Service Option Standard for Wideband Spread Spectrum Digital Cellular System," Entire IS–96, Telecommunications Industry Association, Apr., 1994.

*Primary Examiner*—Seema S. Rao
*Attorney, Agent, or Firm*—Thomas, Kayden, Horstemeyer & Risley LLP

[57] ABSTRACT

In a synchronous fixed frame boundary system with variable data rates, a transmitter inserts into a current frame an indication of the data rate of the next frame. After the first frame is received and processed at a receiver, the variable data rates of subsequent frames are known before processing, thereby reducing processing load. Furthermore, because the rate indication is inserted into the frame to be error protected along with the rest of the frame information, reliability is high, while additional data overhead and complexity are very low. For example, North American code division multiple access (CDMA) digital cellular telephone systems and personal communication system (PCS) utilize variable data rate transmissions. As a station modem (SM) assembles a current frame for convolutional encoding and further processing, the SM inserts a rate indication for the subsequent frame in accordance with information from a vocoder and CPU of the appropriate data rate for the subsequent frame. On the receiving end, rather than needing to decode multiple times to determine the appropriate data rate for every frame, the receiving SM discovers the rate of each frame by analyzing the information contained in the immediately preceding frame. The rate determination process also includes a verification method to ensure accurate data rate determination.

43 Claims, 14 Drawing Sheets

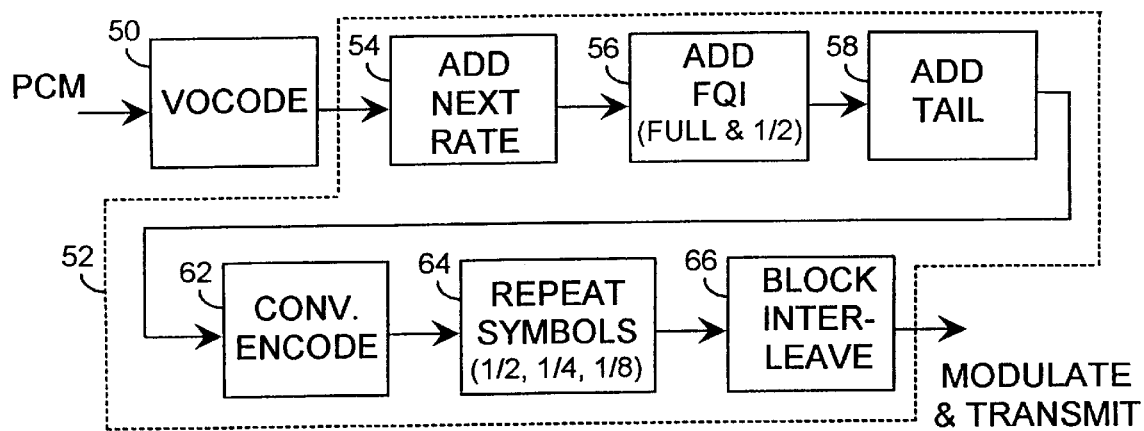
FIG. 3
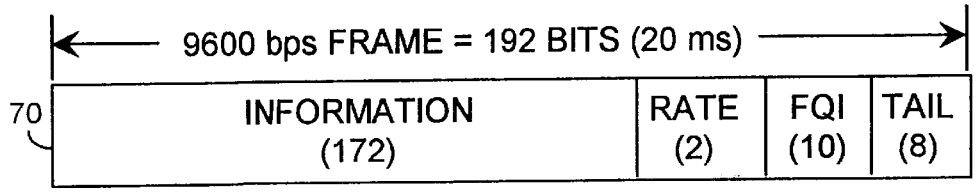
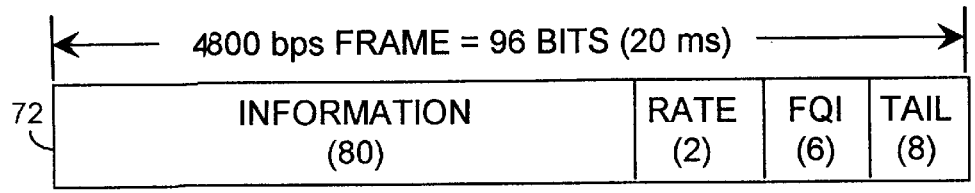
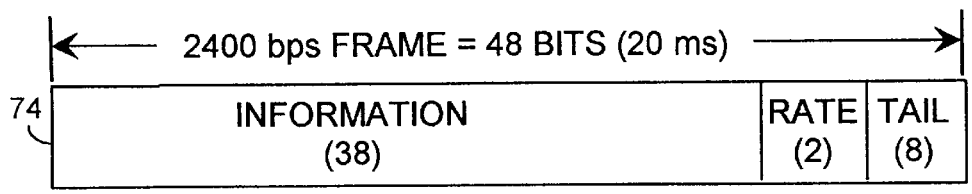
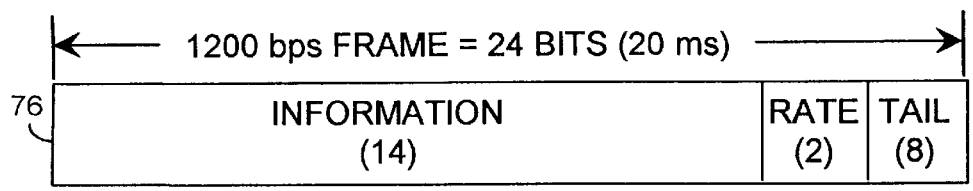
FIG. 4

SUBSEQUENT FRAME VARIABLE DATA RATE INDICATION METHOD FOR VARIOUS VARIABLE DATA RATE SYSTEMS

CROSS-REFERENCE TO RELATED APPLICATION

This application is a continuation of application Ser. No. 08/474,409, filed on Jun. 7, 1995, now abandoned, which is a continuation-in-part of application Ser. No. 08/306,777, filed on Sep. 15, 1994, now U.S. Pat. No. 5,537,410.

BACKGROUND OF THE INVENTION

The present invention relates generally to the field of data communications, and more specifically, to the field of synchronous, fixed boundary, variable data rate communication systems, such as code division multiple access (CDMA) North American digital cellular telephone and personal communication systems.

Synchronous communication systems which utilize fixed frame boundary data frames including data at variable rates are known in the art. One example of such a system is the CDMA North American digital cellular system, a well-known class of modulation using specialized codes to provide multiple communication channels in a designated segment of the electromagnetic spectrum. Thus, the definition of "synchronous" is understood to include all systems in which an attempt is made in at least one transmission direction to synchronize system timing (frame and bit timing are recoverable) between transmitting and receiving stations. The Telecommunications Industry Association (TIA) has standardized a CDMA implementation in the "Mobile Station-Base Station Compatibility Standard for Dual-Mode Wideband Spread Spectrum Cellular System TIA/EIA/IS-95 Interim Standard" (IS-95) and the "Speech Service Option Standard for Wideband Spread Spectrum Digital Cellular System TIA/EIA/IS-96 Interim Standard" (IS-96). Sections 6–6.2.4 and 7–7.2.4 of IS-95 and the entire IS-96 are particularly relevant. In addition, updated versions of these standards, known as IS-95A and IS-96A, are also available. Of particular note in these updated versions are guidelines associated with a second rate set accommodating a higher speed vocoder.

Another example of a variable data rate communication system is the CDMA personal communication system described in the industry standard TIA proposal no. 3384, published as J-STD-008, entitled "Personal Station Base Station Compatibility Requirements for 1.8 to 2.0 GHz Code Division Multiple Access (CDMA) Personal Communication Systems". While other sections are also relevant to the present invention, sections 2.1.3.3–2.2.3 of J-STD-008 are particularly relevant. As would be understood by one reasonably skilled in the art of the present invention, the personal communication system (PCS) mobile and base stations of J-STD-008 are very similar to the mobile and base stations, respectively, of IS-95A except for the operating frequencies, thus, unless otherwise noted, the term "mobile stations" should be understood to refer to cellular mobile stations and personal communication stations.

In the conventional CDMA digital cellular and personal communication systems, variable data rates are utilized to reduce the data transmission rate during times of reduced speech activity. This data rate reduction results both in a reduction of interference with other users (thereby increasing capacity in the system) as well as in a reduction in average transmit power of the CDMA mobile station (thereby increasing battery life). On the transmitter end (transmitting base station or transmitting mobile station), a vocoder (voice or speech encoder/decoder) compares voice energy levels to adaptive thresholds based on background noise levels to determine an appropriate data rate for each frame of speech data, thereby suppressing background noise and providing good voice transmission in noisy environments. Using a code excited linear prediction (CELP) method, the vocoder receives pulse code modulated speech samples and reduces the number of bits required to represent speech by exploiting the intrinsic properties of speech signals to remove redundancy. Subsequently, the speech encoded data is convolutionally encoded for forward error correction before being interleaved and modulated for transmission.

Since the data rate may change at each frame boundary, the CDMA receiver must first determine the data rate of each frame of data. The process by which this is accomplished in the conventional CDMA digital cellular and personal communication systems is a source of wasted time and processing energy. According to the conventional systems, each data frame must be separately processed at each of the various possible data rates (including convolutional decoding) before a decision is made regarding which data rate was utilized on the transmitter end. Since this method is clearly inefficient, there is a need in the industry for a new method for determining the data rate of each frame of data in the CDMA digital cellular and personal communication systems, as well as other systems using fixed boundary frames with variable data rates.

One possible method of addressing this problem is the addition of a conventional header before each frame of data. Such a header could include the data rate of the corresponding frame to which it is attached. Unfortunately, such a header would also need error protection to reduce the likelihood of transmission errors. In view of the relatively small size of each frame of data, the additional bits required for an error protected header would certainly add substantial overhead and undesirable complexity to the system.

There is, therefore, a need in the industry for a system which addresses these and other related, and unrelated, problems.

SUMMARY OF THE INVENTION

Briefly described, the present invention includes a subsequent (or "next") frame variable data rate indication method whereby a transmitter inserts into the frame structure of a current frame an indication of the data rate of the next frame. According to a first preferred embodiment of the present invention, after the first frame is received and conventionally processed at a receiver, the data rates of subsequent frames are known before processing, thereby reducing processing load. Furthermore, because the rate indication is inserted into the current frame to be error protected along with the rest of the frame information, reliability is high, while additional data overhead and complexity are very low.

According to the first preferred embodiment, as applied to one implementation of a CDMA system (cellular or PCS), as a transmitting station modem (SM) (located in either the mobile station or the base station) assembles a current traffic channel frame for convolutional encoding, the transmitting SM inserts an indication of the data rate of the subsequent channel frame of data. In many cases, (e.g. primary traffic frames) a vocoder speech encodes PCM data for the SM and notifies the transmitting SM through a central processing unit (CPU) of the appropriate data rate for the subsequent frame, and in other cases, the CPU issues commands to the SM and the vocoder to influence the selection of the data rate.

The number of bits necessary to provide a one-to-one representation of the various rates equals the smallest integer greater or equal to the $\text{Log}_2$ of the total number of possible rates, e.g., since the current CDMA system utilizes four possible data rates, two bits are adequate to provide a one-to-one indication of each of the possible data rates, whereas three bit would be required to similarly represent five to eight possible rates, etc. In the conventional CDMA IS-95 frame structure (also similar to rate set 1 of IS-95A and J-STD-008), the two indication bits are, for example, easily substituted for two frame quality indication bits for the top two rates and for two information bits for the lower two rates. Since the rate indication is embedded in the structure of the frame itself, the rate indication bits receive the same error protection (error correction and error detection) as the other information in the data frame. Consequently, the current inventive method exhibits high reliability without the need for great complexity or expense.

On the receiving end, rather than needing to process each frame of data multiple times at each of the possible data rates, including convolutional decoding, to determine the appropriate data rate for each frame of data, the receiving SM discovers the data rate of each frame of data subsequent to the first frame of data by analyzing the information contained in the immediately preceding frame of data. In other words, after the very first frame is, in the conventional manner, processed at each of the various rates to determine the appropriate data rate for the first frame, the receiving SM is able to determine the data rate of the second frame of data before needing to process the second frame of data. This process continues so that the data rates of each of the subsequent data frames are determined in the frames preceding each of the subsequent frames.

Additionally, according to the first preferred embodiment of the present invention, in an effort to prevent transmission errors from propagating through the series of data frames, the rate selection process is continually examined, such as through monitoring frame quality indicators, symbol error rates, and/or other methods of determining rate selection integrity, such as using viterbi decoding internal information to determine rate selection accuracy. If FQI (frame quality indication) checking fails, the symbol error rate is too high, or if other rate selection integrity methods indicate improper rate selection, the receiver method further includes conventionally processing the frame at each of the remaining possible rates to ensure accurate data rate determination for that particular frame, after which rate determinations proceed according to the new method. If the rate still cannot be determined after being processed at the various possible data rates, the frame is classified as an erasure frame, and the process continues by processing the next frame as the first frame was processed. As should be evident, the processing load on the receiving SM is greatly reduced by not needing to process each frame at each of the various rates. Thus, for the mobile and base SMs, clearly understood benefits can be realized in reduced power consumption and reduced processing load.

The present invention also includes a second preferred embodiment which is very similar to the first preferred embodiment. However, rather than requiring the receiving station to conventionally process the first frame to determine the proper data rate, this second preferred embodiment includes transmitting the first frame with data at a known data rate so that, at the receiving station, no frame is convolutionally processed at various rates unless an error in transmission occurs, at which point recovery processing proceeds conventionally as in the first preferred embodiment. In addition, a second frame structure is utilized in conjunction with a higher speed vocoder. The second frame structure is an adaptation of the "Rate Set 2" frame structure disclosed in IS-95A and J-STD-008. The two next frame indication bits are substituted for two information bits in the full, quarter, and eighth rate frames and for two frame quality indication bits for the half rate frames. Again, since the next frame rate indication is embedded in the structure of the frame itself, the rate indication bits receive the same error protection (error correction and error detection) as the other information in the data frame. For mixed mode frames including only signaling and/or secondary traffic information (i.e., no speech), an erasure bit in each frame is utilized by the mobile station to request the base station to re-transmit an erroneous frame at a known rate so that, with such "no speech" frames, no frames ever need to be convolutionally processed at various rates to determine transmission rates of those types of mixed mode frames.

According to a third preferred embodiment, the first frame of speech data is immediately preceded by a preamble frame encoded at a known rate. The preamble frame does, however, include a data rate indication for the next frame, corresponding to the first frame of speech data. In this way, it is not necessary that the first frame of speech encoded data be transmitted at a fixed rate. A fourth preferred embodiment of the present invention is also very similar to the second preferred embodiment. The primary differences relate to the method of transferring information between the vocoder and the transmitting SM. Rather than separately outputting the encoded data and then the subsequent frame rate indication, the information is combined and relayed together to the transmitting SM. In another (fifth) preferred embodiment of the present invention, the vocoder has a process delay greater than the sampled time in a frame of data, thus the vocoder speech encodes multiple frames of data simultaneously through a type of parallel vocoder processing. Because of this time overlap, the vocoder is able to determine a data rate of a subsequent frame of data before speech encoding is complete on the current frame of data. This subsequent rate indication is output to the transmitting SM before the current frame of data is output to the transmitting SM.

Other preferred embodiments include inserting subsequent frame rate indications in other locations within the data frame or inserting incremental subsequent frame rate indications which indicate changes in rates (i.e., upward, downward, no change, maximum, minimum, etc.) rather than providing one-to-one indications of the rates. Yet other preferred embodiments include inserting subsequent frame rate indications only in selective frames, such as inserting indications only when a change in rates is about to occur or only for certain types of data frames, such as when assumptions can be made about other types of frames or when it is better to simply allow the other types of frames to be processed conventionally. Still other alternate embodiments include receiving and buffering variable rate data frames from other sources besides the vocoder, such as external variable data rate devices. In still other preferred embodiments of the present invention, rate choice evaluations are employed only occasionally under the assumption that transmission errors are very rare. Additionally, rate choice evaluations are omitted in other embodiments where periodic fixed rate transmissions are imposed to automatically reduce the potential for propagation of rate determination errors. In other words, the transmitting stations of such embodiments periodically transmit frames at known rates according to periods known by the receiving station so that any rate determination errors are automatically fixed.

It is therefore an object of the present invention to provide a subsequent frame variable data rate indication method.

Another object of the present invention is to provide a radio telephone operative to communicate subsequent frame variable rate information.

Yet another object of the present invention is to provide an apparatus and a method for indicating a data rate of a subsequent frame of data in a synchronous, fixed frame boundary system including frames of data at variable data rates.

Still another object of the present invention is to provide an apparatus and a method for inserting a subsequent frame data rate indication into a current frame of data and subsequently error protecting the frame of data.

Another object of the present invention is to provide an apparatus and a method for inserting a subsequent frame data rate indication in a beginning portion of a current frame of data and subsequently error protecting the frame of data.

Yet another object of the present invention is to provide a memory defining a transmission frame memory structure including current frame speech information and a subsequent frame rate indication.

Yet another object of the present invention is to provide a memory defining a convolutionally encoded transmission frame memory structure including current frame speech information, a subsequent frame rate indication, and a frame quality indicator based upon the current frame speech information and the subsequent frame rate indication.

Still another object of the present invention is to provide an apparatus and a method for indicating and determining subsequent frame data rates in a CDMA digital cellular system.

Another object of the present invention is to provide an apparatus and a method for indicating and determining subsequent frame data rates in a CDMA personal communication system.

Yet another object of the present invention is to provide an apparatus and a method for generating a current frame of data, including determining a desired data rate of a subsequent frame of data and inserting an indication of the subsequent frame data rate into the current frame of data.

Still another object of the present invention is to provide an apparatus and a method for receiving a current frame of data and analyzing the current frame of data to determine a data rate of a subsequent frame of data.

Other objects, features and advantages of the present invention will become apparent upon reading and understanding the present specification, when taken in conjunction with the accompanying drawings.

BRIEF DESCRIPTION OF THE DRAWINGS

FIG. 3 is a block diagram representation of selected frame generation functions provided by a vocoder, a CPU, and an SM in accordance with the first preferred embodiment of the present invention.

FIG. 4 is a frame structure diagram for the CDMA traffic channel frames at various rates before being convolutionally encoded in accordance with the first preferred embodiment of the present invention.

DETAILED DESCRIPTION OF THE PREFERRED EMBODIMENTS

Figure 1:
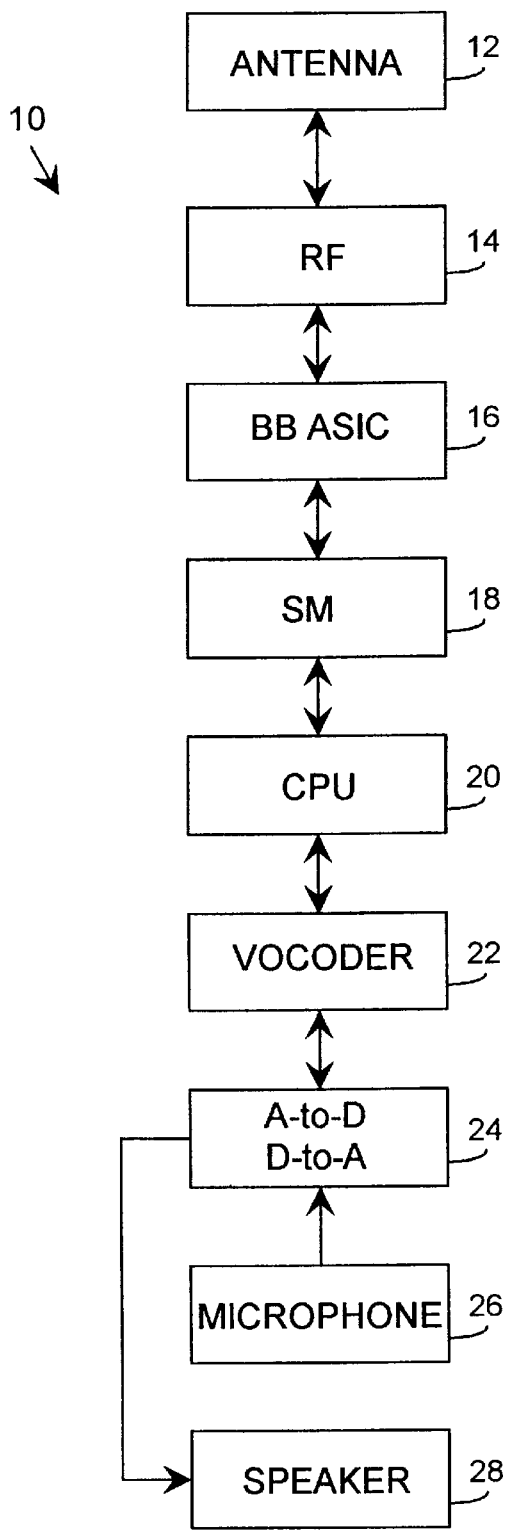
FIG. 1 is a block diagram representation of circuital elements of a speech path in a CDMA digital cellular telephone in accordance with a first preferred embodiment of the present invention.
Figure 2:
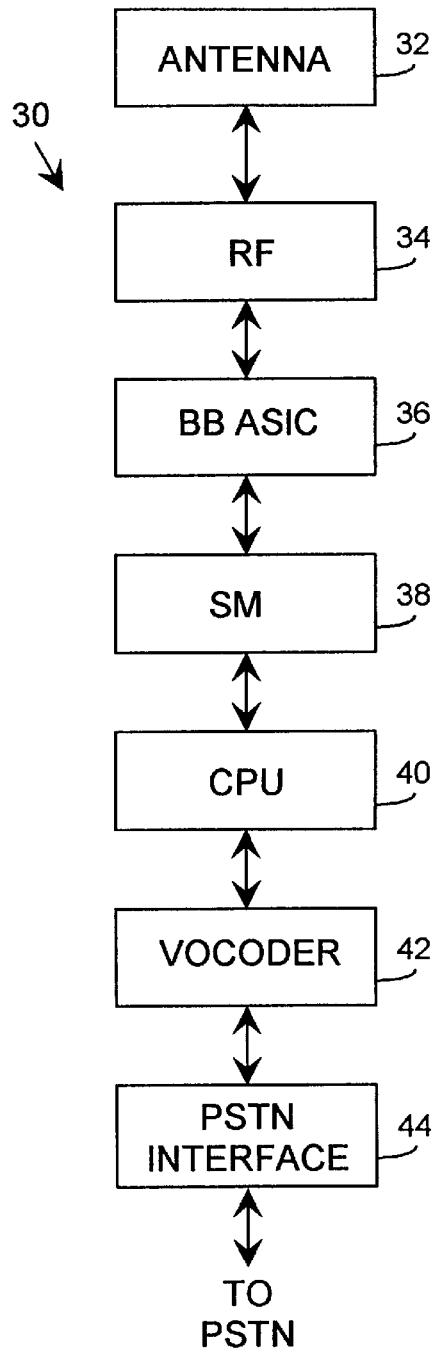
FIG. 2 is a block diagram representation of circuital elements of a speech path in a CDMA base station in accordance with the first preferred embodiment of the present invention.

Referring now in greater detail to the drawings, FIGS. 1 and 2 are very similar to each other since a CDMA mobile station 10, circuital portions of which are represented in FIG. 1, and a CDMA base station 30, circuital portions of which are represented in FIG. 2, both transmit and receive CDMA signals, including traffic channel frames of data. The term "mobile station" is understood to refer to any type of cellular telephone, including units installed in vehicles and hand-held units, including conventional cellular hand-held devices and PCS personal stations. Both the CDMA mobile station 10 and the CDMA base station 30 include, respectively, according to the preferred embodiments of the present invention, an antenna 12, 32, a radio frequency (RF) section 14, 34, a CDMA baseband application specific integrated circuit (BB ASIC) 16, 36, a station modem (SM) 18, 38, a central processing unit (CPU) 20, 40, and a vocoder (voice or speech encoder/decoder) 22, 42. The CDMA mobile station 10 further includes, connected to the vocoder 22, an analog-to-digital/digital-to-analog (A-to-D/D-to-A) converter 24 connected to a microphone 26 and a speaker 28 for interaction with a mobile station user. The CDMA base station 30 further includes a public switched telephone network (PSTN) interface 44 for interaction with the PSTN, as well as other conventional interfaces. In other words, the PSTN interface 44 is understood to include a digital switch connected to both an interface to the PSTN and to other CDMA base stations. Thus, the vocoder 42 is understood to be a pass-through to the PSTN interface 44 (i.e., avoid speech encoding and decoding) for signals to and from other CDMA base stations. In addition, as would be understood by one reasonably skilled in the art, the antenna 32 and CPU 40 of the CDMA base station 30 actually represents multiple elements, i.e., multiple antennas and multiple controllers are represented by blocks 32 and 40.

According to the preferred embodiments of the present invention, except for the SMs 18, 38, CPUs 20, 40, and vocoders 22, 42 of FIGS. 1 and 2, the remaining elements of the CDMA mobile station 10 and the CDMA base station 30 find acceptable examples in conventional elements and circuital combinations functioning as would be understood by those reasonably skilled in the art. Furthermore, the new elements (the SMs 18, 38, CPUs 20, 40, and vocoders 22, 42) also maintain a large degree of similarity to conventional elements, differing only to accommodate the teachings in this specification, as would be understood by those reasonably skilled in the art after review of this specification. In accordance with the preferred embodiments of the present invention, the BB ASICs 16, 36 include customary means for providing baseband frequency analog processing and conversion of signals to and from the digital domain for interfacing with the SMs 18, 38. In particular, functions of the BB ASICs 16, 36 include baseband signal quadrature splitting and combining, baseband analog-to-digital and digital-to-analog conversion, baseband direct current (DC) offset control, local oscillator quadrature generation. Further in accordance with the preferred embodiments of the present invention, the SMs 18, 38 conventionally provide the majority of physical layer signaling through a demodulating unit, a decoding unit, and an interleaving/deinterleaving unit. Among other functional elements, the demodulating unit includes multiple path and searching receivers along with a signal combiner; the decoding unit includes a viterbi decoder and data quality verification means; and the interleaving/deinterleaving unit includes a convolutional encoder, an interleaver, a deinterleaver, a psuedo-random number (PN) sequence spreader, a data burst randomizer, and a finite impulse response (FIR) filter. In addition to customary memory and support circuitry, acceptable examples of the CPUs 20, 40 include conventional static CMOS (complementary-symmetry metal-oxide-semiconductor) high-integration microprocessors with general registers, segment registers, base registers, index registers, status registers, and control registers. The vocoders 22, 42 provide the function of using a code excited linear prediction method to convert between pulse code modulated speech samples and data with a reduced number of bits obtained by exploiting the intrinsic properties of speech signals to remove redundancy.

The following describes examples of acceptable elements of guidance for at least one of the preferred embodiments of the present invention. Except for the internal configuration modifications and other inventive functions discussed herein (programming, etc.), prior art examples similar to those of at least one of the preferred embodiments of the present inventions for the CPUs 20, 40, SMs 18, 38, BB ASICs 16, 36, and vocoders 22, 42, are, respectively, the 80C186 microprocessor available from Advanced Micro Devices of Sunnyvale, Calif., the Q52501-1S2 MSM available from Qualcomm, Inc. of San Diego, Calif., the Q53101-1S2 baseband ASIC also available from Qualcomm, Inc., and, also from Qualconmm, Inc., both the QCELP variable rate CDMA vocoder (first preferred embodiment of the present invention) and the High Rate Speech Service Option CDMA vocoder (13.8 kbps) (second preferred embodiment of the present invention).

Transmissions from the CDMA base station 30 to the CDMA mobile station 10 are often referred to as the forward channel link, whereas transmissions from the CDMA mobile station 10 to the CDMA base station 30 are often referred to as the reverse channel link. Thus, frames of data generated by the CDMA base station 30 and transmitted in the forward channel link between the base station antenna 32 and the mobile station antenna 12 are often referred to as forward channel data frames, and frames of data generated by the CDMA mobile station 10 and transmitted in the reverse channel link between the mobile station antenna 12 and the base station antenna 32 are often referred to as reverse channel data frames. Since both the CDMA mobile station 10 and the CDMA base station 30 are transceivers capable of sending and receiving information, most of the elements of the CDMA mobile station 10 and the CDMA base station 30 are capable of performing transmitter and receiver functions, e.g., both the mobile SM 18 and the base SM 38 are each capable of performing transmitting and receiving functions.

Regarding the general functions of each of the various elements shown in FIGS. 1 and 2, the typical process of speech communication in the forward channel link begins with the PSTN interface 44 receiving pulse code modulated (PCM) speech data from the PSTN. For typical voice telephone calls, PCM speech data is digital data representing digital samples of a user's voice. After this data is passed through the PSTN interface 44, the data arrives at the base station vocoder at 64 kbps (8 kHz samples of $\mu$-law 8 bits per sample). Conversely, in the reverse channel link speech is received into the microphone 26 and supplied in analog form to the A-to-D/D-to-A converter 24 which converts the speech into a digital signal which is similar to that supplied to the base station vocoder 42. Thus, in the first preferred embodiment of the present invention, the typical input for both the base station vocoder 42 and the mobile station vocoder 22 are streams of PCM speech data. However, as discussed above, the CDMA base station 30 is also capable of receiving encoded signals from other base stations which simply pass through the PSTN interface 44 and vocoder 42 to the CPU 40.

Subsequently, the transmitting functions for both the CDMA mobile station 10 and the CDMA base station 30 are relatively similar. On a high level, the vocoders 22, 42, CPUs 20, 40, and SMs 18, 38 cooperate to assemble channel frames of data, as discussed in more detail below. Subsequent to the SMs 18, 38, the channel frames of data are processed in a conventional manner by the BB ASICs 16, 36 and RF sections 14, 34 to be converted to analog signals, modulated and transmitted through the antennas 12, 32. When receiving channel frames of data, the CDMA mobile station 10 reverses the above-stated functions to finally produce PCM speech data output from the vocoder 22 and then converted into analog signals and output through the speaker 28. Likewise, the CDMA base station 30 produces PCM speech data through the vocoder 42 and PSTN interface 44 for transmission on the PSTN and passes encoded data through to other mobile stations.

Now, regarding a more specific description of the new functions of the vocoders 22, 42, CPUs 20, 40, and SMs 18, 38, since the relevant process steps are similar in both the forward and reverse links, the process will be described from the viewpoint of the CDMA mobile station 10, but it should be understood that the process is also applicable to the CDMA base station 30. Refer now also to FIG. 3 which shows a block diagram representation of selected frame generation functions. A vocode function 50 is shown preceding a group of selected SM & CPU functions 52. The PCM speech data is first vocoded (speech encoded) as indicated by the vocode function 50. The CPU 20 acts as an interface between the vocoder 22 and SM 18. The selected SM & CPU functions 52 include an add next rate function 54, an add frame quality indicator (FQI) for full and half rates function 56 (i.e., CRC for error detection), an add encoder tail function 58, a convolutionally encode function 62 for forward error correction, a repeat symbols for half, quarter, and eighth rates function 64, and a block interleave function 66 for combating burst errors. Refer briefly to FIG. 4 which shows a frame structure diagram for CDMA traffic channel frames at various rates as the frames exist immediately before the convolutionally encode function 62. The frame structures include a full rate frame structure 70, a half rate frame structure 72, a quarter rate frame structure 74, and an eighth rate frame structure 76. After the block interleave function 66, as would be understood by one reasonably skilled in the art, other conventional SM functions, broadly termed "modulate" in FIG. 3, are also performed by the SM 18, including 64-ary orthogonal modulating, data burst randomizing, long code generating, offset quadrature phase shift key modulating, filtering, etc., as discussed above.

Referring back to FIG. 3, the vocode function 50 includes converting frames of PCM speech data into frames of speech encoded data at variable data rates to be included as information in subsequently formed traffic channel frames of data. Thus, the term "frame of data" can refer to a frame of PCM data, a frame of speech encoded data and/or a channel frame of data (traffic channel) which includes as information a frame of speech encoded data. In a conventional manner, the vocode function 50 includes comparing voice energy levels to adaptive thresholds based on detected background noise levels to determine an appropriate data rate for each frame of speech encoded data, and, using a code excited linear prediction (CELP) method, removing intrinsic redundancies to reduce the number of bits required to represent the speech. Such rate determination is, however, subject to rate selection commands from the CPU 20. Thus, the conventional vocode (speech encoding) function includes receiving PCM speech data and outputting frames of speech encoded data at variable data rates. However, in a quite unconventional manner, the vocode function 50 of the present invention also includes determining a data rate of a subsequent frame of speech encoded data and outputting an indication of that rate for being included in the current channel frame of data, as shown by the add next rate function 54. Thus, according to the first preferred embodiment of the present invention, the vocoder outputs frames of speech encoded data at, for example, 8600 bps, 4000 bps, 1900 bps, and 700 bps. After next frame data rate indicator bits, FQI bits, and encoder tail bits are added, the frames represent 9600 bps, 4800 bps, 2400 bps, and 1200 bps as shown in FIG. 4.

Figure 5:
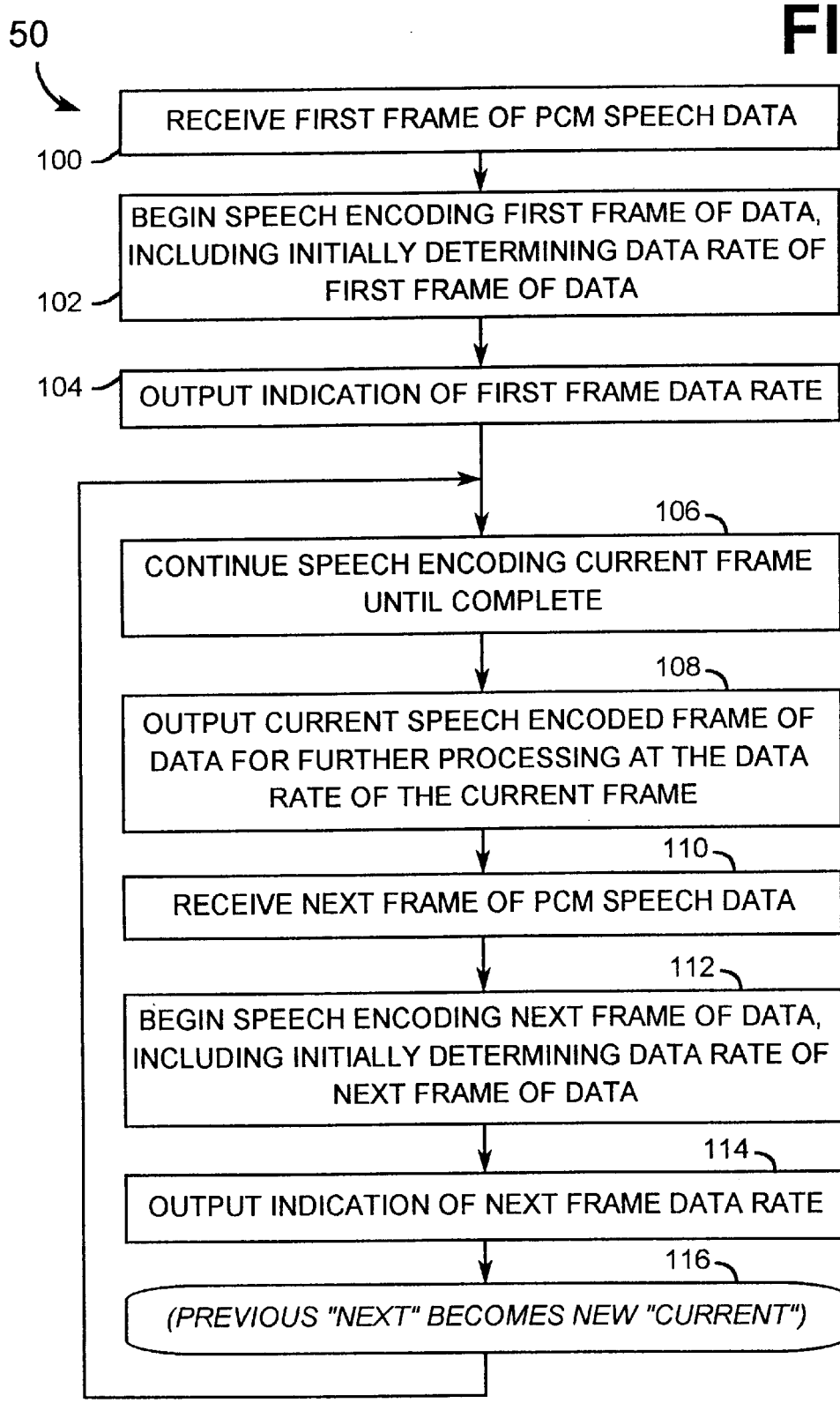
FIG. 5 is a flow chart representation of selected frame generation steps taken by a transmitting station vocoder in accordance with the first preferred embodiment of the present invention.

Refer now to FIG. 5 which, in accordance with the first preferred embodiment of the present invention, shows a flow chart representation of steps of the vocode (speech encode) function 50 of FIG. 3 as performed by the mobile station vocoder 22 (FIG. 1) in the reverse channel link (again understanding that similar steps are taken by the base station vocoder 42 (FIG. 2) in the forward channel link). A first step 100 includes receiving a first frame of PCM speech data for processing into a first frame of speech encoded data (also referred to as a speech encoded frame of data). Subsequently, in step 102, the vocoding (speech encoding) process begins for the first frame, including an initial step of determining a data rate for the first frame of data through the above-discussed adaptive threshold method. Step 104 shows that an indication of the first data rate is then output from the vocoder (transmitted to the SM 18 through the CPU 20). Speech encoding continues in step 106 until complete, after which the current speech encoded data frame is output in step 108 (during the initial pass through the vocode function 50, the "current" frame is equivalent to the "first" frame and the "next" frame is the "second" frame). The next frame of PCM data is received in step 110, and the data rate of the next frame is quickly determined in step 112. Thus, unlike other speech encoding methods that determine data rates late in the speech encoding process, the present method is one in which an indication of this newly determined data rate of the next frame is generated early and then output from the vocoder 22 in step 114. Also, even if, depending on implementation choices, a slight delay in generating the traffic channel data frame is introduced through the generation of the subsequent frame data rate indication, a reduction in time required to determine the data rate on the receiving end of the transmission is available. Subsequently, as indicated at step 116, the process loops back to step 106 where yet another frame of PCM speech data is received, and the process continues.

Figure 6:
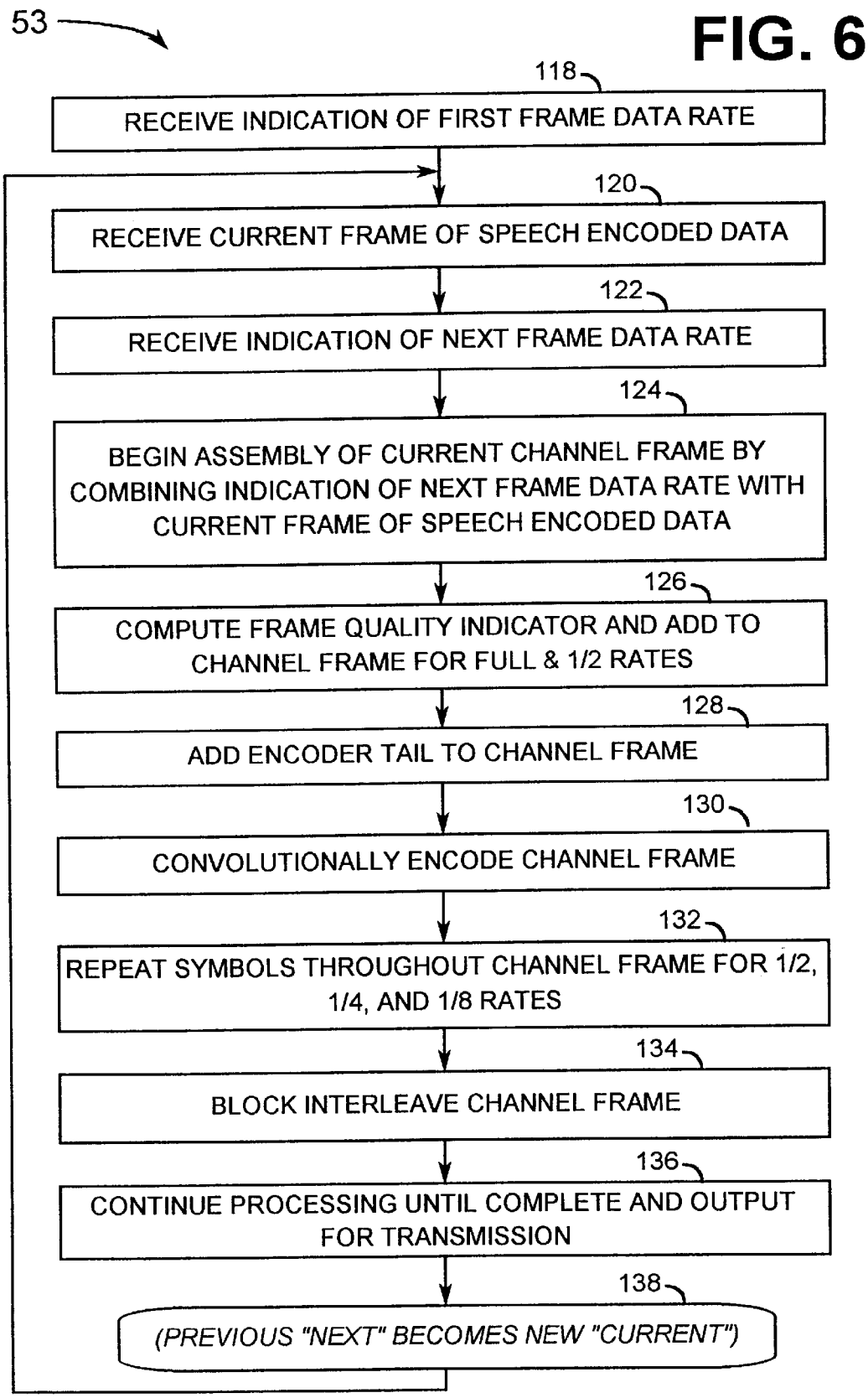
FIG. 6 is a flow chart representation of selected frame generation steps taken by the transmitting station SM and CPU in accordance with the first preferred embodiment of the present invention.

The next frame rate indication consists of two bits in the first preferred embodiment of the present invention since two bits are adequate to provide a one-to-one representation of the four possible data rates. With any number of possible rates, the number of bits necessary to provide a one-to-one representation of the various rates equals the smallest integer greater or equal to the $\text{Log}_2$ of the total number of possible rates. Refer now also to FIG. 6 which shows a flow chart representation of selected channel frame assembly steps 53 taken by the SM 18 and CPU 20 (and SM 38 and CPU 40). According to the first preferred embodiment, the first frame data rate indication (for the first pass, "current" is equivalent to "first", and "subsequent" is equivalent to "second") is stored by the SM 18 and CPU 20 (step 118) until the current frame of speech encoded data (step 120) and the next frame data rate indication (step 122) arrive from the vocoder 22, as explained above. Thus, when the SM 18 and CPU 20 have both the subsequent frame data rate indication and the current frame of speech encoded data, both are combined into the beginnings of a current traffic channel frame of data (step 124), as indicated by the add next rate function 54 (FIG. 3). Another way of expressing this combining function is that the subsequent frame data rate indication is embedded or inserted into the current channel frame of data which contains the current frame of speech encoded data as the information portion of the current channel frame of data. Furthermore, it is understood that the exact bits for the subsequent frame data rate indication received from the vocoder 22 need not necessarily be used as the actual subsequent frame data rate indication, rather the SM 18 and CPU 20 are understood to generate and insert bits representative of the subsequent frame data rate indication.

Subsequently, for the full and half rates, a frame quality indicator is computed and added to the current channel frame of data, as also indicated by the add FQI function 56 of FIG. 3. Then, encoder tail bits are added to the current channel frame of data, as shown by step 128 of FIG. 6 and the add encoder tail function of 58. Thus, as shown in FIG. 4, the pre-encoder frame structures of the first preferred embodiment differ from conventional channel frame structures in that the subsequent frame data rate indication is substituted for two FQI bits for the full and half rate structures 70, 72, and for two information bits in the quarter and eighth rate structures 74, 76 (i.e., the conventional frame structures include 12 FQI bits for full rate, 8 FQI bits for half rate, 40 information bits for quarter rate, and 16 information bits for eighth rate). As discussed below, this particular placement of the subsequent frame data rate indications, as well as the particular format of the rate indications, are given only as acceptable examples of the teaching of the present invention. Additionally, since, in the first preferred embodiment, the add FQI function 56 (step 126) includes computing the FQI based upon the information and subsequent frame data rate indication, additional error detection capabilities are realized.

After the current channel frame of data is assembled in one of the rate formats shown in FIG. 4, the current channel frame of data is convolutionally encoded at the data rate for the current frame of data, as indicated by step 130 of FIG. 6 and the convolutionally encode function 62 of FIG. 3. In this way, the subsequent frame data rate indication is also encoded along with the information bits to provide good error correction for the subsequent frame data rate indication without additional overhead or complexity. Subsequent to convolutional encoding, encoder symbols (representative of pre-encoder bits) are repeated throughout the frame for rates lower than full rate (step 132 of FIG. 6, function 64 of FIG. 3), and block interleaving is used to further protect the integrity of the current channel frame, including the indication of the next frame data rate (step 134, function 66). Both of these functions, as well as the remaining steps necessary for completing the processing (step 136), including modulation, etc., are conventional steps as would be understood by those reasonably skilled in the art. Finally, this process loops back through step 138 to step 120 as shown in FIG. 6 for processing the next channel frame of data.

Figure 7:
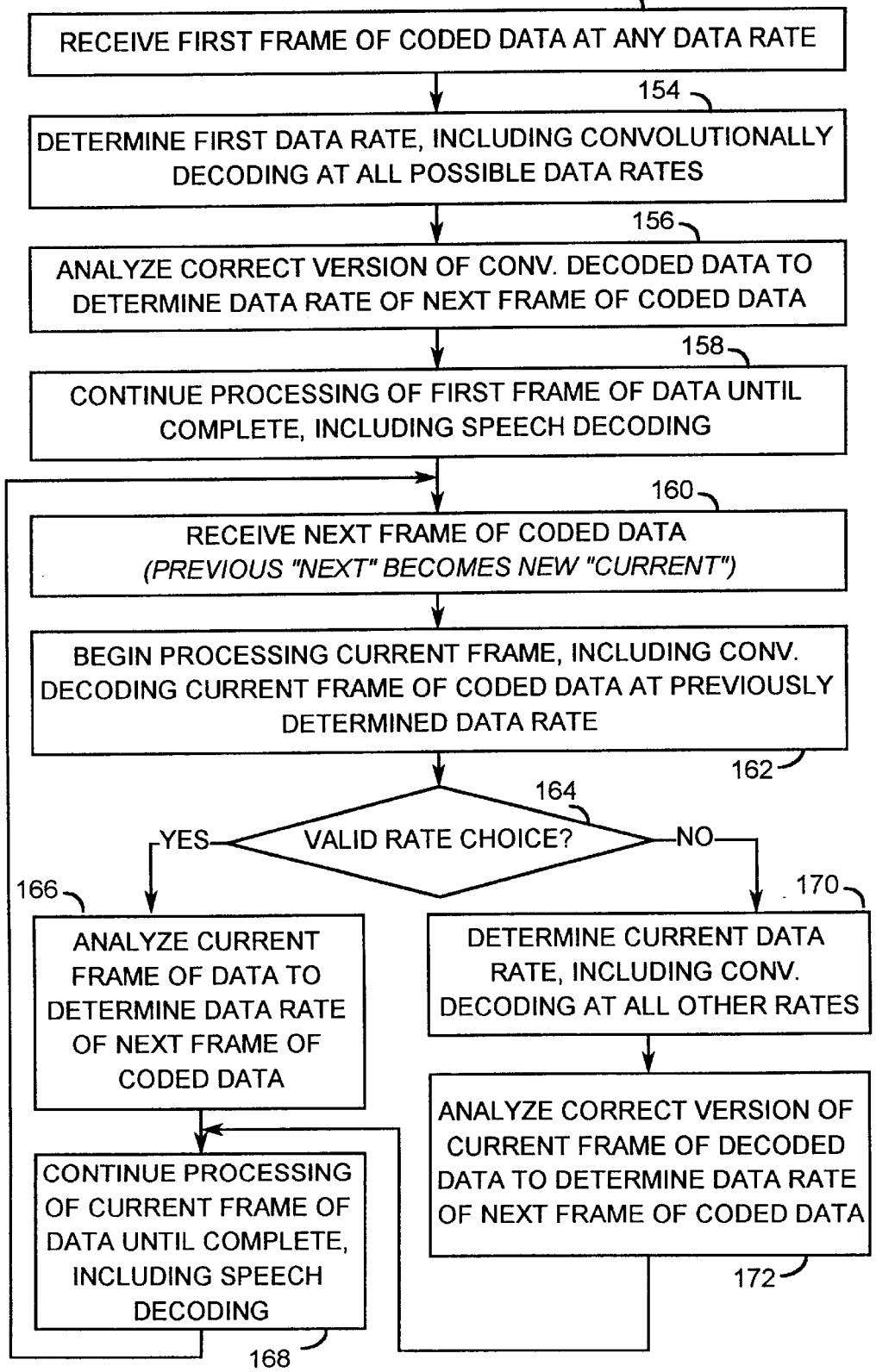
FIG. 7 is a flow chart representation of selected frame analysis steps taken by the receiving station vocoder, SM and CPU in accordance with the first preferred embodiment of the present invention.

On the receiving end of a transmission of a channel frame of data, such as the forward traffic channel link, (understanding that similar events occur in the reverse link) the CDMA mobile station 10 is able to easily determine the data rate of the information contained in the next channel frame of data. Refer now to FIG. 7 which shows a flow chart representation of selected frame analysis steps taken by the vocoder 22, CPU 20, and SM 18 in accordance with the first preferred embodiment of the present invention. A first step includes receiving a first channel frame of data (convolutionally encoded data) at one of the four potential data rates (step 152). Subsequently, the SM 18 processes the first channel frame of data at all of the four possible data rates to determine (through conventional analysis of FQI bits, symbol error rates, and other means for determining whether the correct rate has been chosen, etc.) the correct data rate of the first frame of data. Then, in step 156, the data rate of the next channel frame of data is determined by isolating and analyzing the subsequent frame data rate indication of the current channel frame of data. Step 158 indicates that processing of the first channel frame of data is then completed, including speech decoding the information at the current data rate.

Next, equipped with an expectation of the data rate of the next channel frame of data, the SM 18 receives the next channel frame of data in step 160, at which point that "next" becomes "current". Then, the frame of data is processed at the expected data rate, including reversing functions 66, 64, and 62 of FIG. 3. In an effort to prevent transmission errors from propagating through the series of data frames, the validity of the choice of rate chosen for each processed frame is evaluated at decision block 164 through, as an example, an FQI analysis and a symbol error rate analysis. For example, for the full and half rates, if FQI checking passes, and for the quarter and eighth rates, if the symbol error rate is below its corresponding rate-related threshold, the rate is determined to be valid, and the operation proceeds through the YES branch to step 166. In addition, the scope of the present invention is understood to include other known methods of determining whether the choice of chosen rate is correct, such as using viterbi decoding internal information to determine rate selection accuracy. At that point, the current frame is analyzed to isolate the subsequent frame data rate indication and determine the data rate of the next channel frame of data. Subsequently, in step 168, processing of the current frame of data is continued until complete, and the process loops back to step 160 to continue processing. If the data rate was not found to be valid at decision block 164, conventional processing is utilized in step 170 to determine the appropriate data rate for the current frame and then, in step 172, determine the data rate of the next frame of data from the subsequent frame data rate indication before continuing with step 168 as shown. Also, though not shown, in FIG. 7, if the rate still cannot be determined after being processed at the various possible data rates, the frame is classified as an erasure frame, and the process continues by processing the next frame as the first frame was processed in step 152.

Figure 8:
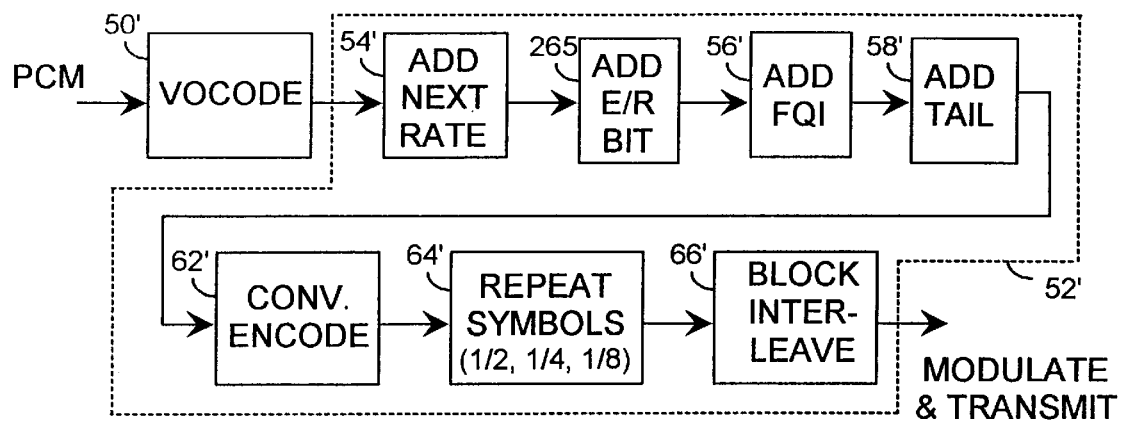
FIG. 8 is a block diagram representation of selected frame generation functions provided by a vocoder, a CPU, and an SM in accordance with a second preferred embodiment of the present invention.
Figure 9:
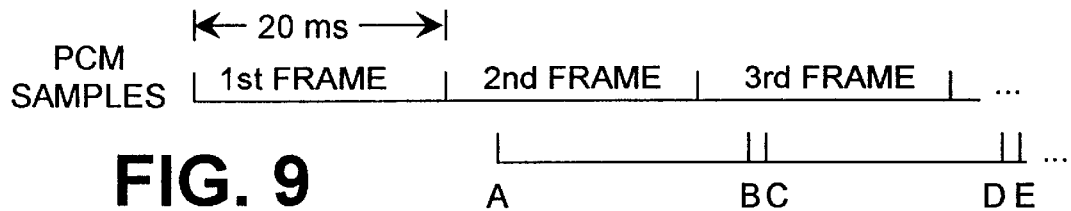
FIG. 9 is a vocoder timing diagram in accordance with the second preferred embodiment of the present invention.
Figure 10:
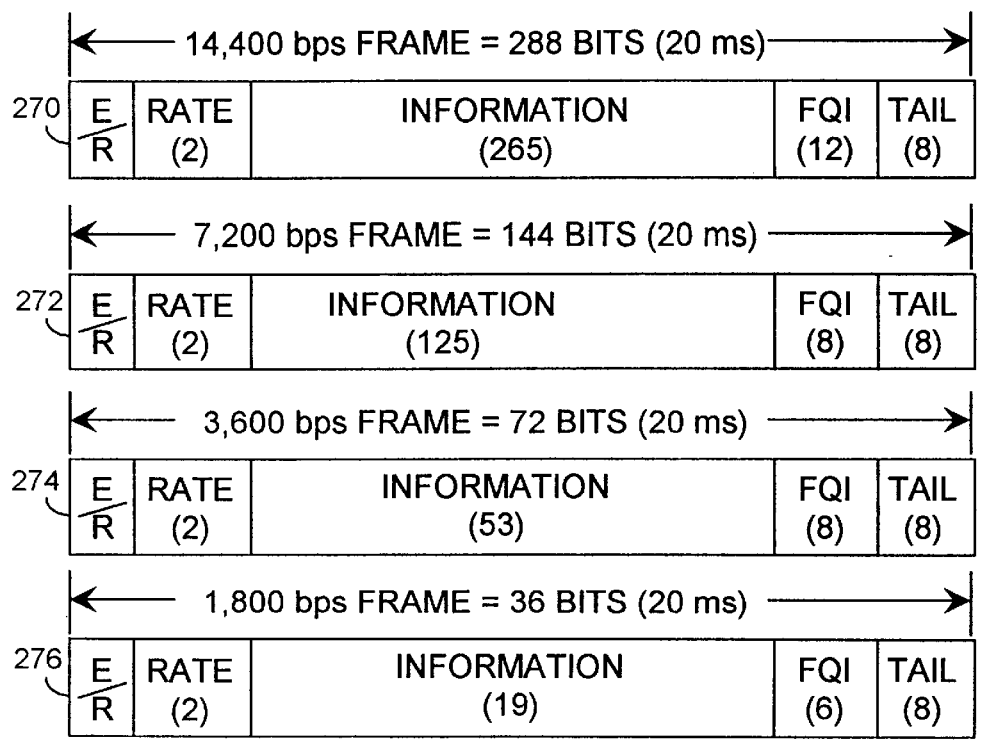
FIG. 10 is a frame structure diagram for the CDMA traffic channel frames at various rates before being convolutionally encoded in accordance with the second preferred embodiment of the present invention.

The present invention also includes a second preferred embodiment which, in many respects, is very similar to the first preferred embodiment. Refer now to FIG. 8 which shows a block diagram representation of selected frame generation functions. A vocode function 50' is shown preceding a group of selected SM & CPU functions 52'. The selected SM & CPU functions 52' include an add next rate function 54', an add erasure/reserved (E/R) bit function 265, an add frame quality indicator (FQI) function 56', an add encoder tail function 58', a convolutionally encode function 62' for forward error correction, a repeat symbols for half, quarter, and eighth rates function 64', and a block interleave function 66' for combating burst errors. FIG. 9 is a vocoder timing diagram in accordance with the second preferred embodiment of the present invention. As the vocoder 22' (a variation of vocoder 22 of FIG. 1 adapted for the second preferred embodiment) receives a continual supply of PCM samples, (bit-by-bit or sub-frame bursts) the data can be divided into 20 ms frames as shown, and the vocoder 22' is configured to double-buffer the PCM data. The known data rate of the first frame is determined by the vocoder 22' (for example, responsive to a full rate control command from the CPU 20', a variation of CPU 20 of FIG. 1 adapted for the second preferred embodiment) and then made available to be output early in the speech encoding processing of the first frame of PCM samples, as indicated at time "A". Then, at some point up until time "B", the vocoder 22' finishes encoding the first frame of PCM data and makes it available to the CPU 20'. Subsequently, the data rate of the second frame is calculated and made available at time "C" (shortly after time "B", and approximately 20 ms after time "A"), and the process continues such that the second frame of encoded data is made available at some point up until time "D" (approximately 20 ms after time "B"). Further discussion of the vocoder function 50' and the selected SM & CPU function 52' is given below. FIG. 10 shows a frame structure diagram for CDMA traffic channel frames at various rates as the frames exist immediately before the convolutionally encode function 62', in accordance with the second preferred embodiment of the present invention. The frame structures include a full rate frame structure 270 (14,400 bps), a half rate frame structure 272 (7,200 bps), a quarter rate frame structure 274 (3,600 bps), and an eighth rate frame structure 276 (1,800 bps).

Figure 11:
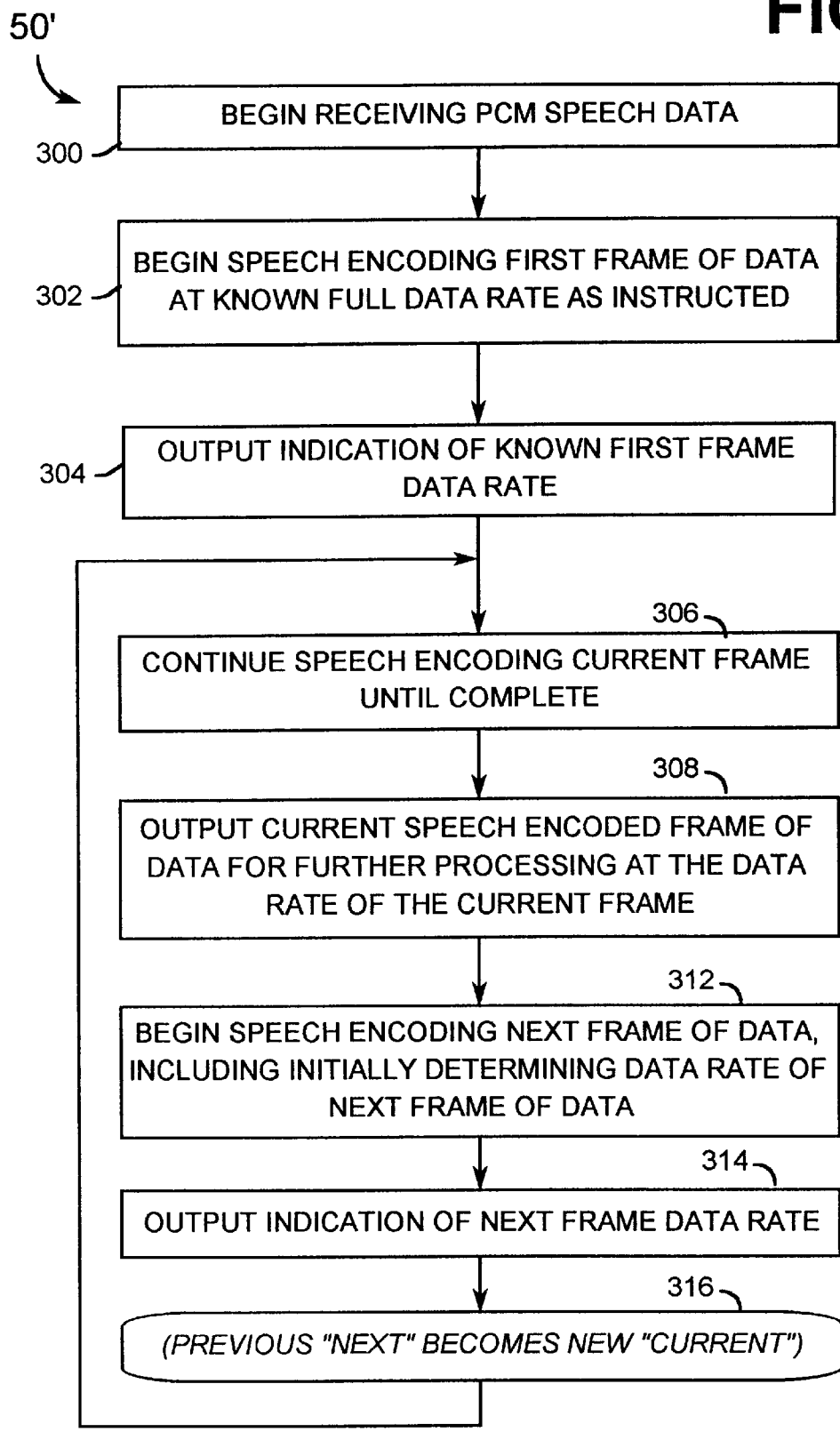
FIG. 11 is a flow chart representation of selected frame generation steps taken by a transmitting station vocoder in accordance with the second preferred embodiment of the present invention.

Refer now also to FIG. 11 which, in accordance with the second preferred embodiment of the present invention, shows a flow chart representation of steps of the vocode (speech encode) function 50' of FIG. 8 as performed by the mobile station vocoder 22' (FIG. 1) in the reverse channel link, again understanding that similar steps are taken by the base station vocoder 42' (a variation of the vocoder 42 of FIG. 2 adapted for the second preferred embodiment) in the forward channel link. A first step 300 includes beginning the process of receiving continual PCM speech data. The first 20 ms of PCM data received will be processed into a first frame of speech encoded data. Thus, in step 302, the vocoding (speech encoding) process begins for the first frame, including an initial step of determining a speech encoding data rate for the first frame of data. According to this second preferred embodiment, the first frame data rate is required through instructions from the CPU 20' to the vocoder 22' to be a known full rate. Step 304 shows that an indication of the first data rate is then made available for output to the CPU 20' (time "A" in FIG. 9). Speech encoding continues in step 306 until complete, after which the current (first) speech encoded data frame is made available for output in step 308 (a point in time up until time "B" in FIG. 9). The data rate of the next (second) frame is quickly determined in step 312, and an indication is made available for output to the CPU 20' at step 314 (time "AC" in FIG. 9). Beginning with the second frame, (step 312, first pass) the above-discussed adaptive threshold method is utilized to determine the speech encoding rate, subject to other conventional CPU 20' rate control commands. Furthermore, because of the operation of the conventional Hamming window technique, a small portion of PCM data from the subsequent next frame (e.g., the third frame) is also examined (step 312) in determining the best speech encoding data rate for the second and subsequent frames, as would be understood by one reasonably skilled in the art, an example of which is described in IS-96, section 2.4.3.2.2. Subsequently, as indicated at step 316, the process loops back to step 306, and the process continues.

Figure 12:
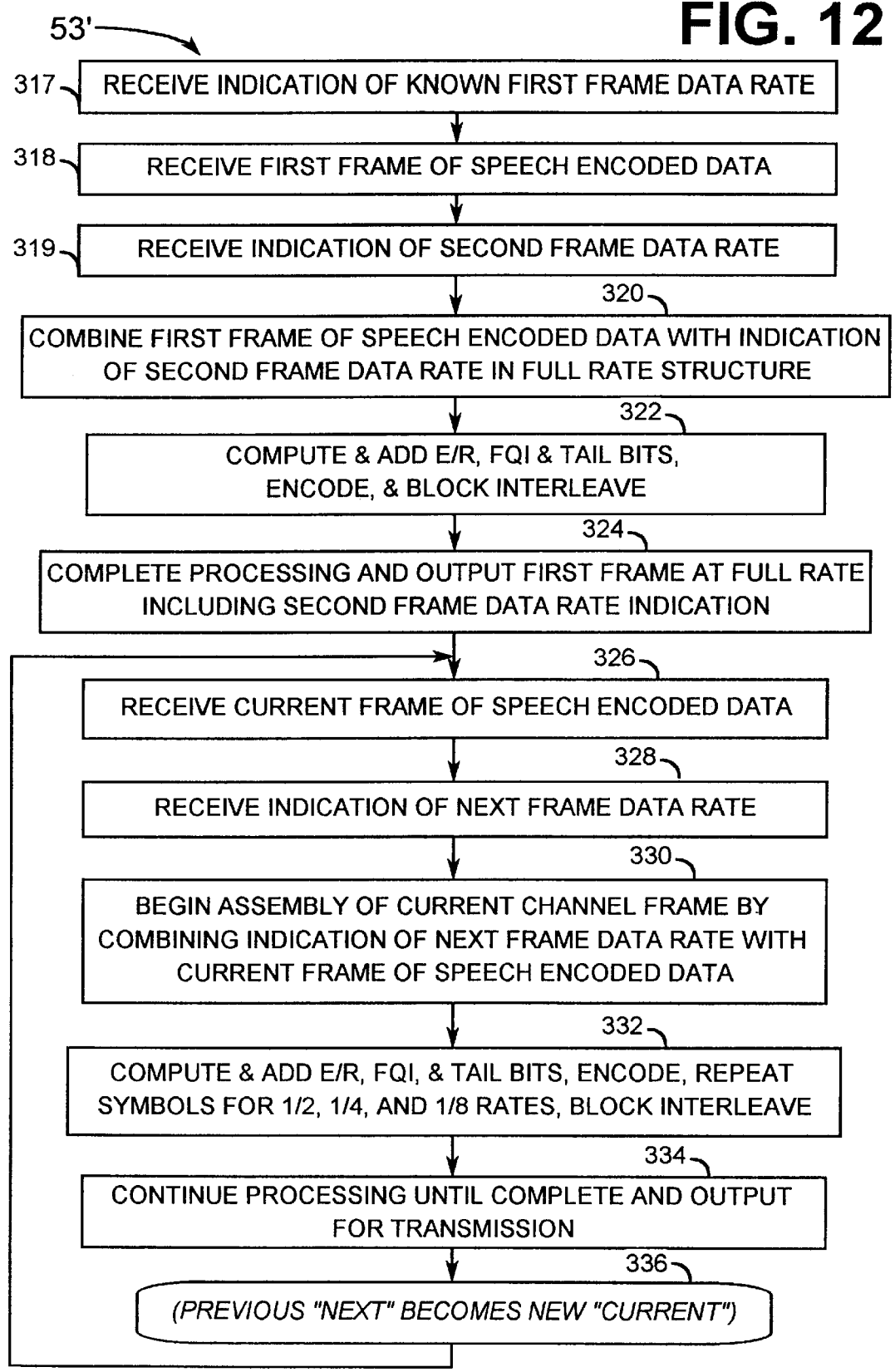
FIG. 12 is a flow chart representation of selected frame generation steps taken by the transmitting station SM and CPU in accordance with the second preferred embodiment of the present invention.

Refer now also to FIG. 12 which shows a flow chart representation of selected channel frame assembly steps 53'. In accordance with the second preferred embodiment of the present invention, as shown in steps 317–324, a first frame is generated and output at a standard full rate, e.g., 288 bits at 14,400 bps. The known first frame data rate indication, first frame of speech encoded data, and second frame data rate indication are received as shown in steps 317–319. In step 320, the first frame speech encoded data is combined with the second frame data rate indication in a known full rate frame structure. In step 322, an E/R bit is computed and added (the function of which is explained in detail below), and a frame quality indicator is computed and added to the traffic channel frame along with encoder tail bits to produce a first traffic channel frame at the full rate frame structure. No symbol repetition is necessary since the frame is a full rate frame. Finally, the first traffic channel frame is encoded and block interleaved before the processing is further finalized in step 324 and output. It is understood that other embodiments of the present invention omit steps 304 of FIG. 11 and 317 of FIG. 12 since the CPU 20' is already knowledgeable of the known first frame data rate.

In step 326, the CPU 22' receives the current frame of speech encoded data (at this point, the "second" frame of speech encoded data) and subsequently receives the indication of the next frame data rate in step 328. In step 330, as shown in FIG. 8, assembly of the current traffic channel frame begins by adding the next rate indication to the current frame of speech encoded data. Then, depending on the data rate of the current speech encoded data, the traffic channel frame will be formed in step 332 according to one of the structures shown in FIG. 10 before being finalized and output in step 334. The pre-encoding frame structures of the second preferred embodiment differ from conventional CDMA higher rate (standard Rate Set 2) traffic channel frame structures in that the subsequent frame data rate indication is substituted for two information bits for the full, quarter and eighth rate structures 270, 274, and 276, and for two FQI bits in the half rate structure 272.

Figure 13:
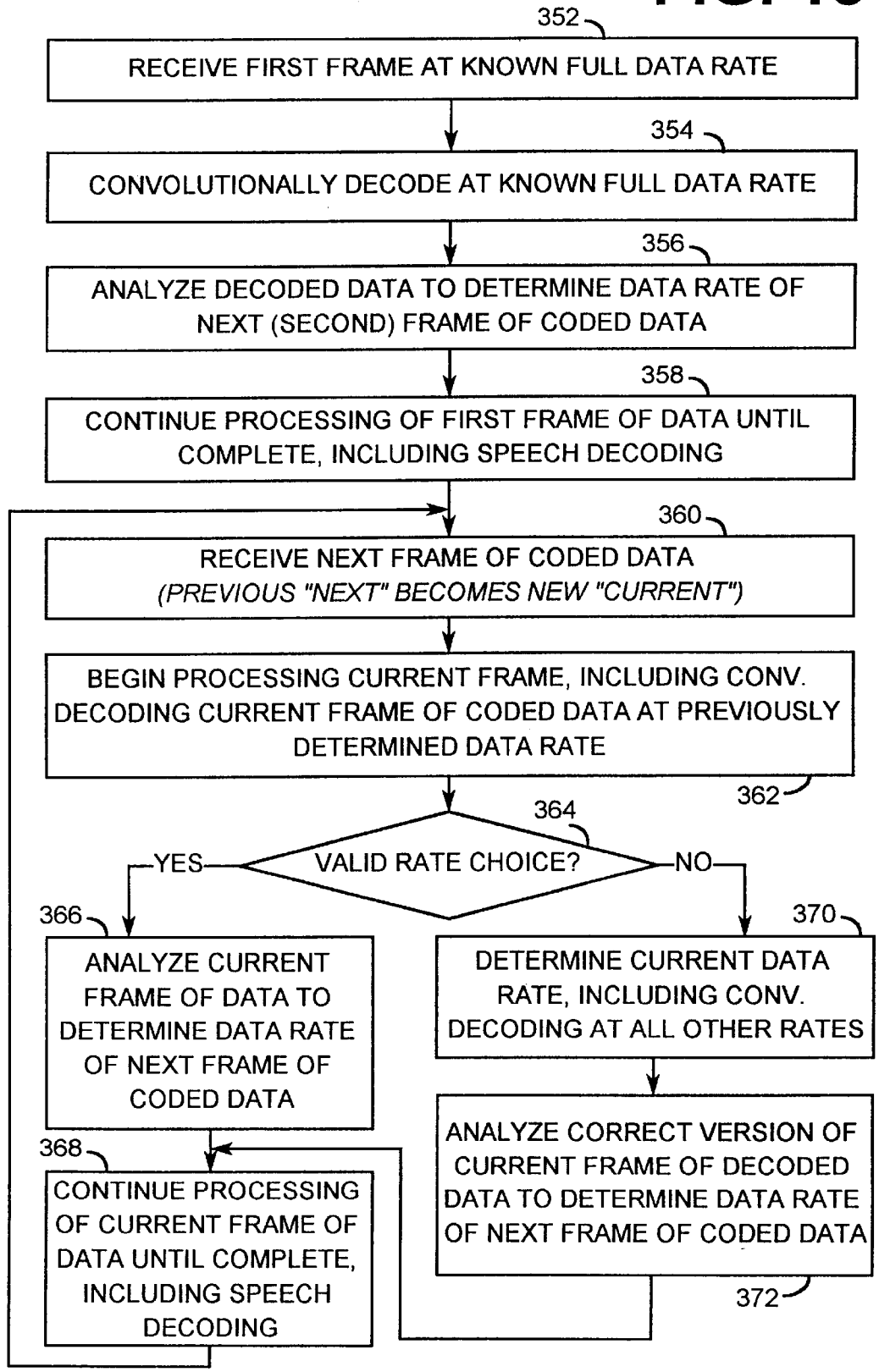
FIG. 13 is a flow chart representation of selected frame analysis steps taken by the receiving station vocoder, SM and CPU in accordance with the second preferred embodiment of the present invention.

On the receiving end of a transmission of a traffic channel frame of data, such as the forward traffic channel link, (understanding that similar events occur in the reverse link) data rate determination is simplified. Refer now to FIG. 13 which shows a flow chart representation of selected frame analysis steps taken by the vocoder 22', CPU 20', and the SM 18' in accordance with the second preferred embodiment of the present invention. FIG. 13 is very similar to FIG. 7, thus the first and second preferred embodiments of the present invention are very similar to each other with respect to the operations represented by FIGS. 7 and 13. The primary differences between FIGS. 7 and 13 relate to steps 352 and 354 where it is shown that the very first frame is received and convolutionally decoded at the known full rate. The first frame's decoded data is then analyzed to determine the data rate of the next traffic channel frame (step 356), corresponding to the second frame of speech encoded data, before processing continues in step 358. Then, with step 360, operation proceeds as in the first preferred embodiment.

Up until this point, the diagrams and discussions regarding the present invention have referred essentially to primary traffic frame structures which do not include signaling or secondary traffic information. The scope of the present invention is certainly intended to extend to such "mixed-mode" frame structures which include signaling and/or secondary traffic information. Any necessary modifications to the diagrams would be understood by those reasonably skilled in the art. Of particular note would be, for example, for the second preferred embodiment, adding before steps 320 and 330 steps which include adding into the traffic channel the signaling or secondary traffic data and bits identifying the structure of the frame. In addition, it would be necessary to adapt the next frame rate indication in anticipation of the overall frame data rate of the mixed mode frame. In other words, as is understood by those reasonably skilled in the art, the primary speech data may be speech encoded at, for example, a half rate and combined with signaling information into a full rate frame structure. This technique is also used in other embodiments of the present invention where frames are required to be transmitted at a known rate, such as the second preferred embodiment where the first frame is transmitted at a known rate, yet the vocoder 22' is allowed to determine the speech encoding rate. In other words, the CPU 20' and SM 18' would utilize mixed mode frames to accommodate speech encoding rates which are determined by the vocoder 22' to be less than full rate. Furthermore, for any of the frame structures of the present invention conceptually formed by exchanging frame quality indicator bits of the conventional frame structures for the next frame data rate indications, the frame structures of the information bits of those mixed-mode frames structures would be similar to the conventional information bit frame structures. On the other hand, for any of the frame structures of the present invention conceptually formed by exchanging information bits of the conventional frame structures for the next frame data rate indications, the frame structures of the information bits of those mixed-mode frames structures would change to maintain a consistent number of primary traffic bits.

Furthermore, in accordance with the second preferred embodiment of the present invention, the E/R bit is used as an erasure bit in the reverse traffic channel link and a reserved bit in the forward traffic channel link. Other embodiments of the present invention certainly include designating an erasure bit for both directions of transmission. According to the second preferred embodiment, for frame types utilizing the erasure bit method (mixed-mode frame structures which do not include any speech data, i.e., purely signaling or secondary traffic), the step of convolutionally decoding at various rates to determine the correct rate (step 370 in FIG. 13) is replaced (or, in other embodiments, supplemented) by steps of using the erasure bit to notify the base SM 38' to retransmit the erasure frame at a known full rate which can then be processed at that known rate when received by the mobile station 10.

Figure 14:
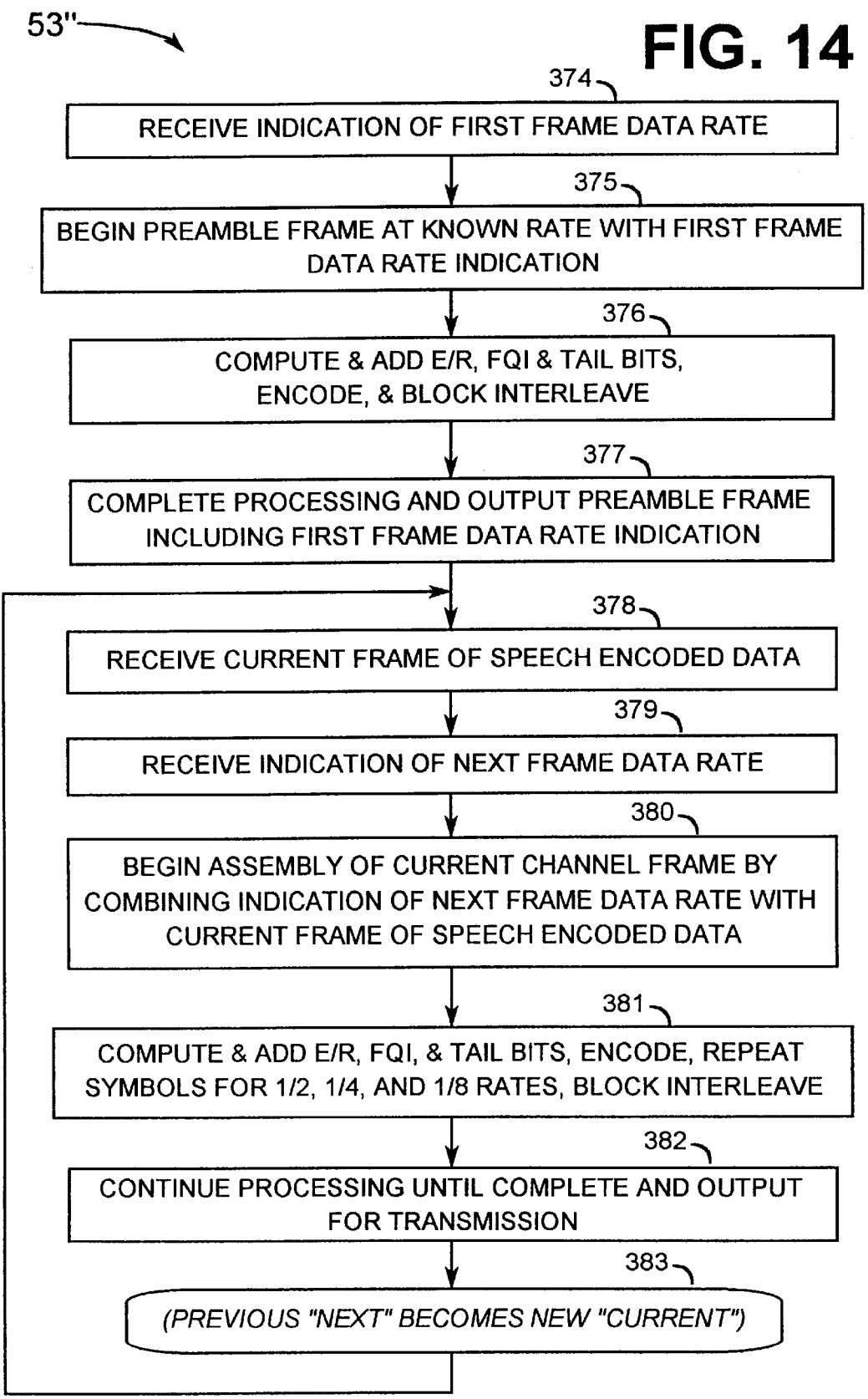
FIG. 14 is a flow chart representation of selected frame generation steps taken by a transmitting station SM and CPU in accordance with a third embodiment of the present invention.

Refer now also to FIG. 14 which shows a flow chart representation of selected channel frame assembly steps 53". In accordance with a third preferred embodiment of the present invention, as shown in steps 374–377, a preamble frame encoded at a known rate is first generated and output. This third embodiment of the present invention is very similar to the second preferred embodiment in utilizing the vocode function 50' (FIG. 11) of the second preferred embodiment. However, the first frame speech encoding data rate is not required to be predetermined. The preamble frame includes either blank speech information or signaling information, depending on the need for signaling information at that time, and an indication of the data rate of the next frame, i.e., the data rate of the first frame of speech encoded data. Accordingly, the first frame data rate indication is received (step 374) and combined in the preamble frame structure (step 375). In step 376, an E/R bit is computed and added, and a frame quality indicator is computed and added to the traffic channel frame along with encoder tail bits to produce a preamble traffic channel frame. Finally, the preamble traffic channel frame is encoded and block interleaved before the processing is further finalized in step 377 and output. Steps 374–377 take place at some point between times "A" and "B" on FIG. 9. In step 378, the CPU 22" receives the current frame of speech encoded data (at this point, the "first" frame of speech encoded data) and subsequently receives the indication of the next frame data rate in step 379. In step 380, assembly of the current traffic channel frame begins by adding the next rate indication to the current frame of speech encoded data. Then, depending on the data rate of the current speech encoded data, the traffic channel frame will be formed in step 381 according to one of the structures shown in FIG. 10 before being finalized and output in step 382.

Figure 15:
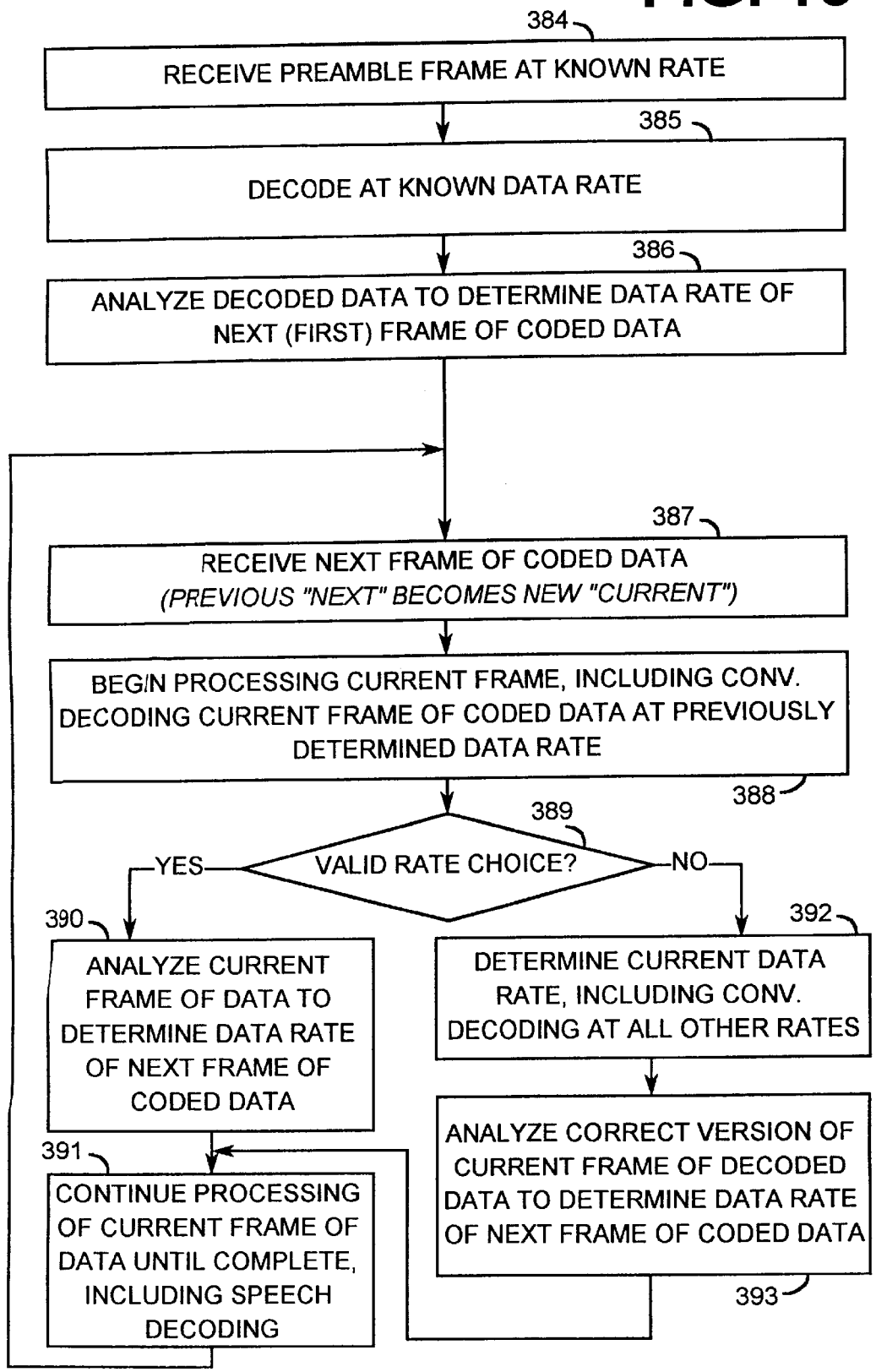
FIG. 15 is a flow chart representation of selected frame analysis steps taken by the receiving station vocoder, SM and CPU in accordance with the third preferred embodiment of the present invention.

On the receiving end of a transmission of a traffic channel frame of data, such as the forward traffic channel link, (again understanding that similar events occur in the reverse link) data rate determination is again simplified. Refer now to FIG. 15, which shows a flow chart representation of selected frame analysis steps taken by the vocoder 22", CPU 20", and the SM 18" in accordance with the third preferred embodiment of the present invention. The very first frame to be received will be the preamble frame encoded at the known rate. Thus, after receiving the preamble frame in step 384, the SM 18" convolutionally decodes the preamble frame at the known rate in step 385 before analyzing the decoded data to determine the data rate of the next traffic channel frame (step 386), which corresponds to the first frame of speech encoded data. Then, with step 387, operation proceeds as in the second preferred embodiment.

Figure 16:
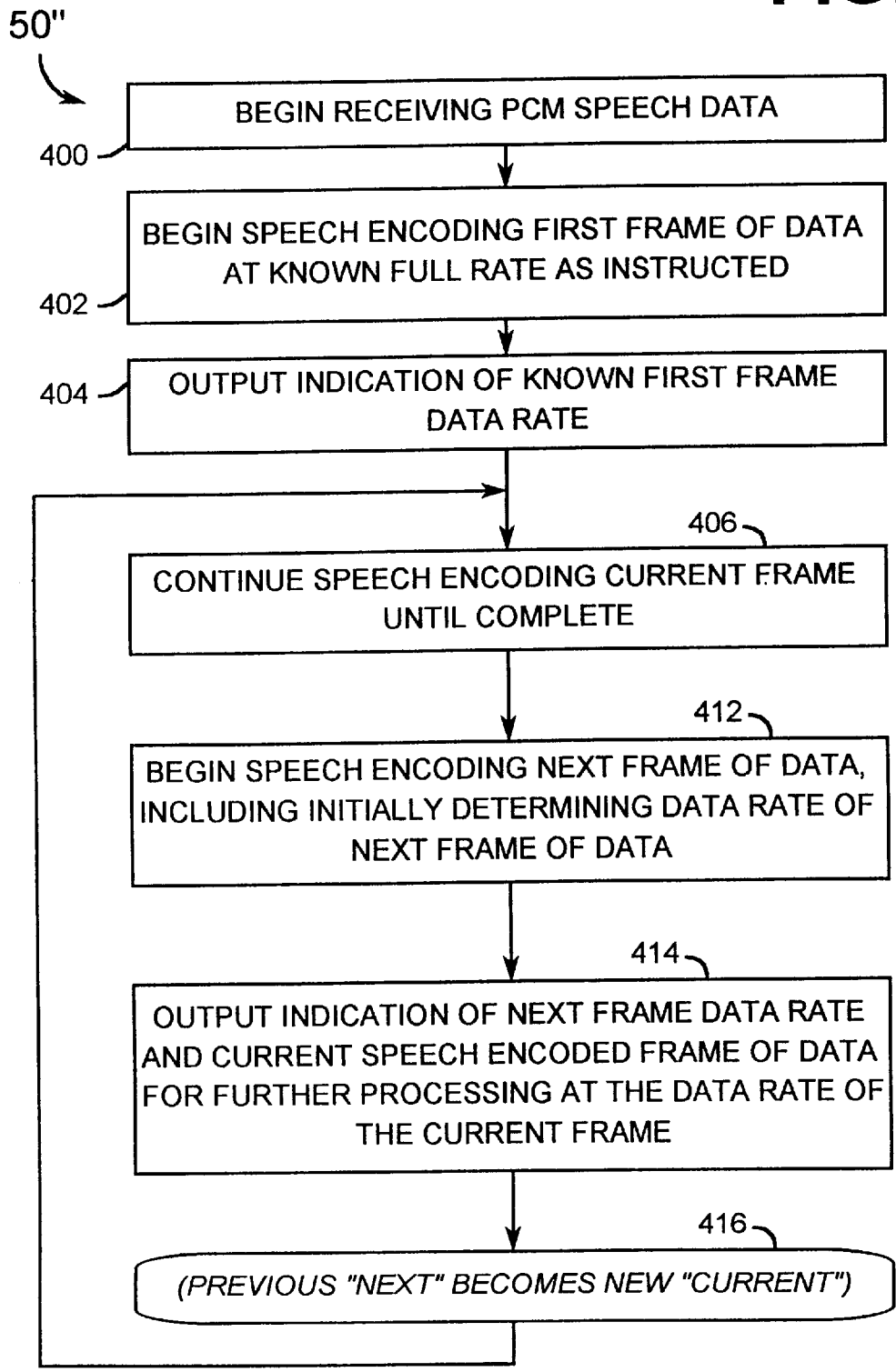
FIG. 16 is a flow chart representation of selected frame generation steps taken by a transmitting station vocoder in accordance with a fourth preferred embodiment of the present invention.

According to a fourth preferred embodiment of the present invention, as represented in FIG. 16, vocoder steps of the second embodiment are combined so that the vocoder outputs only one package of data per frame to the CPU. After the first frame, such an output to the CPU and SM would include the current speech encoded data and the indication of the subsequent frame data rate, as indicated in step 414 of FIG. 16 and the omission of a step corresponding to step 308 in FIG. 11. Others steps of the fourth preferred embodiment are similar to steps of the second preferred embodiment as represented in FIG. 11.

Figure 17:
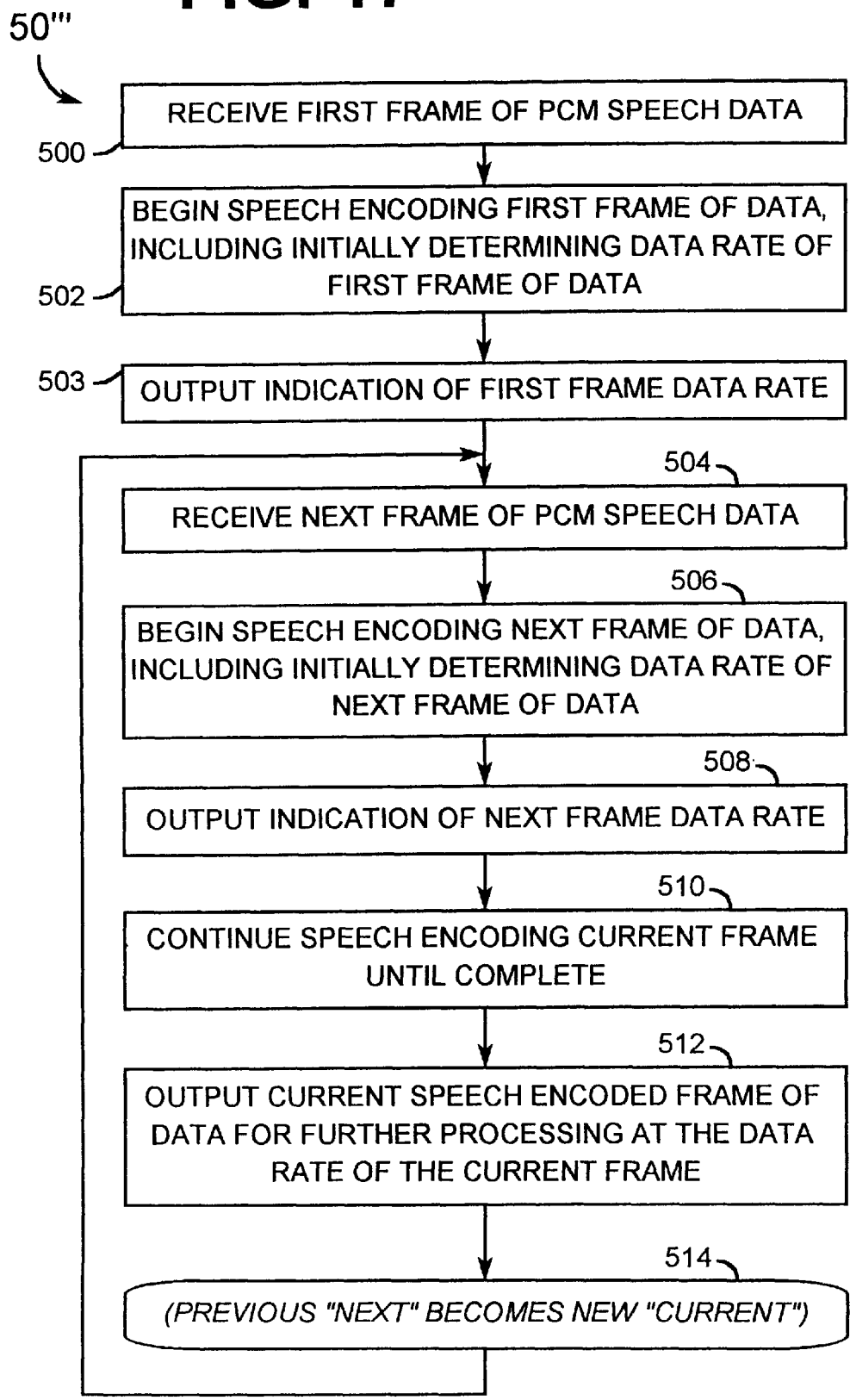
FIG. 17 is a flow chart representation of selected frame generation steps taken by a vocoder in accordance with a fifth preferred embodiment of the present invention.

According to a fifth preferred embodiment of the present invention, as represented by an alternate vocode function 50'" in FIG. 17, after proceeding in a manner similar to the first preferred embodiment of the present invention, PCM data for the next frame of speech encoded data is received in step 504, before the speech encoding processing on the first frame of data is complete. This is due to the vocode function 50'" requiring more time than (have a process delay greater than) the amount of time represented by one frame of data, e.g., 20 ms. Thus, the vocoder of this alternate embodiment processes multiple frames of data simultaneously in a parallel processing arrangement (steps 502, 503, 510, and 512 related to one processor, and steps 506 and 508 related to a second), as evidenced by step 506 where the speech encoding process also begins on the next (subsequent) frame of data. Because of this time overlap, the alternate vocoder is able to determine and output a data rate of the next frame of data before speech encoding is complete on the current frame of data, as evidence by steps 508–512. Accordingly, the corresponding selected SM & CPU functions (represented in FIG. 6 for the first preferred embodiment) would be changed by reversing the order between steps 120 and 122 since the next frame data rate would arrive at the SM before the current frame of speech encoded data.

Figure 18:
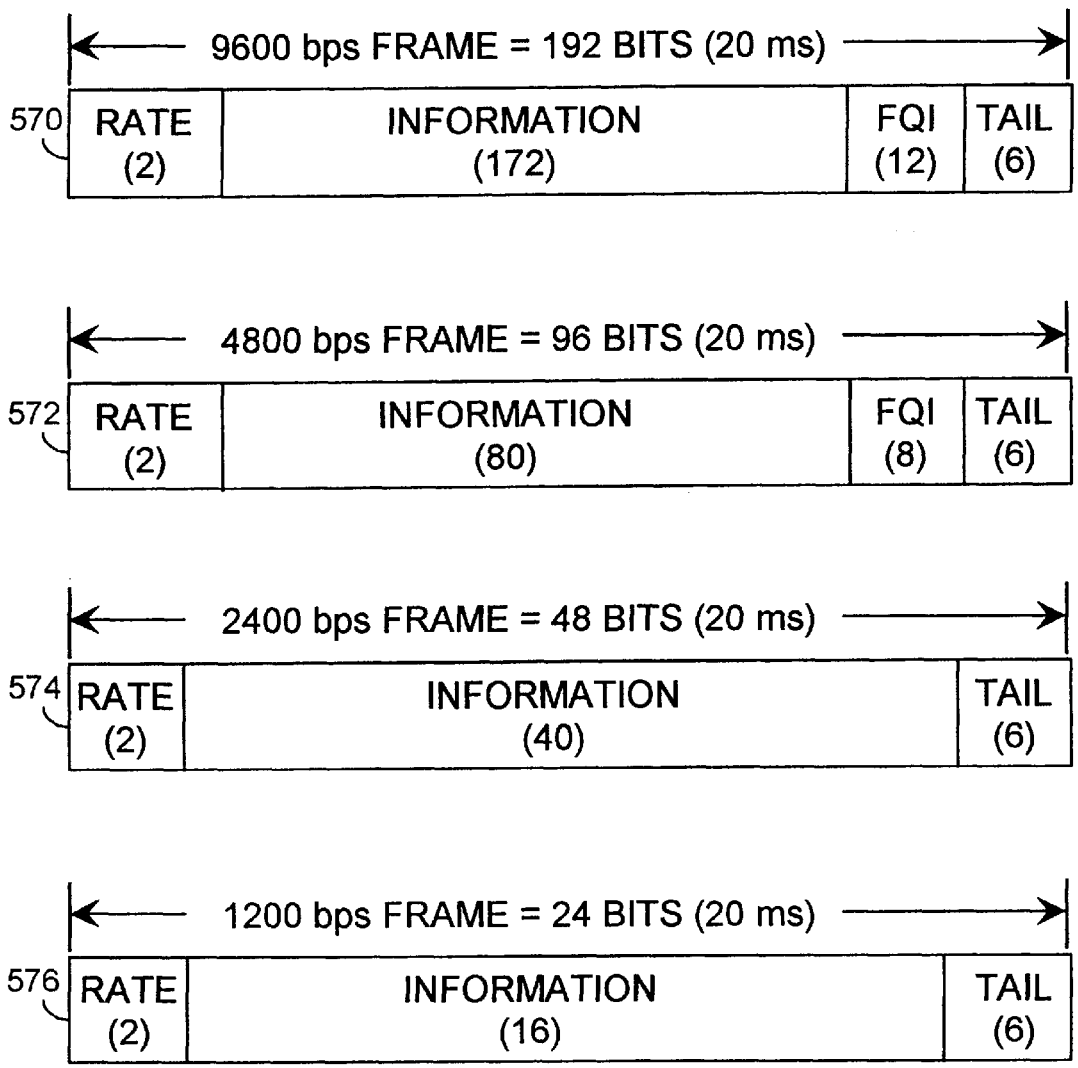
FIG. 18 is a frame structure diagram for the CDMA traffic channel frames at various rates before being convolutionally encoded in accordance with a sixth preferred embodiment of the present invention.

FIG. 18 shows a frame structure diagram for the CDMA traffic channel frames at various rates before being convolutionally encoded in accordance with a sixth preferred embodiment of the present invention. This sixth embodiment is identical to the first embodiment of the present invention except for distinctions related to the frame structure shown in FIG. 18. Rather than using information or FQI bits for the subsequent frame data rate indication bits, two tail bits from each rate of the conventional frame structure are used, and the subsequent frame data rate information is placed at the beginning of the frame. To accomplish such a reduction in tail size, the convolutional encoding method utilizes the conventional tailbiting "unknown tail" method whereby starting and ending states are the same for the coded message. This method is understood by those skilled in the art, as discussed in "An Efficient Adaptive Circular Viterbi Algorithm for Decoding Generalized Tailbiting Conventional Codes", IEEE Transactions on Vehicular Technology, Vol. 43, No. 1, February 1994, pages 57–68.

The present invention also includes various other preferred embodiments, especially those formed by combining the various disclosed preferred embodiments. In one such embodiment, depending on the amount of time required by the vocoder for any particular frame, data (speech data or rate indication data) is output to the SM and CPU whenever available. Since vocoders often take more or less time depending on the rates used, the next frame data rate indication may be available and output before or after the current frame speech encoded data.

In another class of preferred embodiments of the present invention, rate choice evaluation steps are performed only occasionally under the understanding that transmission errors are normally very rare. Additionally, rate choice evaluations are omitted in other embodiments where periodic fixed rate transmissions are imposed to automatically reduce the potential for propagation of rate determination errors. In other words, the transmitting stations of such embodiments periodically transmit frames at known rates according to periods known by the receiving station so that rate determination errors are addressed.

Yet other preferred embodiments include inserting the subsequent frame data rate indications in alternate locations within the data frame or inserting incremental subsequent frame data rate indications which indicate changes in rates (i.e., upward, downward, no change, maximum, minimum, etc.) rather than providing one-to-one indications of the rates. Still other preferred embodiments of the present invention include inserting subsequent frame data rate indications only in selective frames, such as inserting indications only when a change in rates is about to occur or for certain types of data frames, such as when assumptions can be made about other types of frames or when it is better to simply allow the other types of frames to be processed conventionally. Similarly, a system in which only one direction of communication utilizing subsequent frame rate identifications is also contemplated. In one example of such a system, forward traffic channel frames transmitted by the base station, for example, would include subsequent frame rate identifications, yet reverse traffic channel frames transmitted by the mobile station would not include such indications. Such a system would be applicable when base station receiving resources are freely available for conventional rate determinations and/or when it is advantageous not to use mobile station transmitting resources to include such subsequent frame rate indications.

Still other preferred embodiments include speech encoding processes which receive PCM data in other formats and at other rates, such as linear PCM as opposed to $\mu$-law PCM, as well as outputting frames of alternate lengths, such as those encompassing 10 ms of sampled speech. Other preferred methods include variable data rate communication systems other than the CDMA digital cellular systems and PCS systems. Furthermore, other preferred embodiments include receiving and buffering variable rate data frames from other sources besides the vocoder, such as external data devices communicating at variable data rates. Still other preferred embodiments include utilizing alternate error protection (error detection and error correction) methods, such as various block encoding methods as opposed to the convolutional encoding method disclosed. Finally, as would be understood by one reasonably skilled in the art, many of the elements of the various preferred embodiments of the present invention can easily be split into combinations of more discrete elements or combined into fewer, more complex elements, as well as combined and substituted for functional elements of the various embodiments. Thus, the scope of the present invention certainly includes any such increase or decrease in the number and complexity of elements necessary to perform the described functions, as well as combinations of the various embodiments. One particular combination of note includes modifying the second preferred embodiment of the present invention to utilize the slower rate frame structures of the first preferred embodiment. Furthermore, all of the rate frame structures of the preferred embodiments, as well as others contemplated herein, can easily be used with any of the various methods of the preferred embodiments taught or suggested herein.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the equivalents of all means- or step-plus-function elements in the claims below are intended to include any structure, material, or acts for performing the function as specifically claimed and as would be understood as acceptable substitutes by persons skilled in the art.

What is claimed is:

1. A method of receiving fixed boundary data frames, including preventing transmission errors from propagating through a series of fixed boundary data frames transmitted in a synchronous system, the data frames including data at variable data rates, the method comprising steps of:

performing a rate selection process, including decoding at one data rate per fixed boundary data frame and selecting a data rate based upon a subsequent frame data rate included in a current fixed boundary data frame;

continually examining the rate selection process for selecting the variable data rates;

determining rate selection integrity;

responsive to rate selection integrity indicative of improper rate selection, processing a data frame at data rates of the variable data rates other than a rate corresponding to the improper rate selection to ensure accurate data rate determination for the data frame.

2. The method as claimed in claim 1, further comprising a step of transmitting the frames of data at periodic fixed rates to automatically reduce the potential for propagation of rate determination errors.

3. The method as claimed in claim 1, wherein said transmitting step includes a step of transmitting the frames of data at known rates according to periods known by a receiving station so that rate determination errors are addressed.

4. The method as claimed in claim 1, wherein said determining step includes a step of determining rate selection integrity using viterbi decoding internal information of the data frames to determine rate selection accuracy.

5. The method as claimed in claim 1, wherein, responsive to rate selection integrity indicative of improper rate selection for all of the variable data rates, said processing step includes a step of classifying the data frame as an erasure frame.

6. The method as claimed in claim 1, wherein responsive to transmission errors being rare, said determining step and processing step are employed only occasionally.

7. The method as claimed in claim 1, wherein, the synchronous system transmits the frames periodically at known data rates according to predetermined periods known by the synchronous system so that any rate determination errors are automatically fixed, and wherein, responsive to the frames being periodically transmitted at the known data rates, said determining step and processing step are omitted.

8. A method of forming fixed boundary data frames, including assembling a selected channel frame structure of a series of fixed boundary data frames transmitted in a synchronous system, the method comprising steps of:

receiving an indication of a known first frame data rate;

receiving a first frame of speech encoded data;

receiving an indication of a second frame data rate;

combining the first frame of speech encoded data with the indication of the second frame data rate in a known full rate frame structure;

computing and adding a first erasure/reserved bit, a first frame quality indicator, and first tail bits to produce a first traffic channel frame at the full rate fame structure, and encoding and block interleaving the first traffic channel frame;

complete processing of the first traffic channel frame as a first frame and outputting the first frame at the full rate including the second frame data rate indication;

receiving a current frame of speech encoded data;

receiving an indication of a next frame data rate;

combining the current frame of speech encoded data with the indication of the next frame data rate to begin assembly of a current traffic channel frame;

computing and adding a second erasure/reserved bit, a second frame quality indicator, and second tail bits to form the current traffic channel frame at the next frame data rate, and encoding and block interleaving the current traffic channel frame; and complete processing of the current traffic channel frame as a current frame and outputting the current frame for transmission.

9. The method as claimed in claim 8, further comprising a step of using an erasure bit for re-transmitting an erasure frame at the known full rate which can then be processed at the known full rate.

10. The method as claimed in claim 8, wherein the first and second erasure/reserved bits are used as erasure bits in a reverse traffic channel link and reserved bits in a forward channel link.

11. The method as claimed in claim 8, wherein the current frame of speech encoded data of said current frame of speech encoded data receiving step is a second frame of speech encoded data.

12. The method as claimed in claim 8, wherein said current traffic channel frame complete processing step includes outputting the current frame at the next frame data rate.

13. The method as claimed in claim 8, wherein the indication of a next frame data rate of said indication of a next frame data rate receiving step is substituted for two information bits in full, quarter, and eight rate structures, and for two frame quality indicator bits in a half rate structure.

14. The method as claim in claim 8, further comprising a step of adding into the first and current traffic channels signaling or secondary traffic data and bits identifying the structure of the frames.

15. The method as claimed in claim 8, further comprising a step of adding into the first and current traffic channels signaling information combined into full rate frame structures, and wherein the speech encoded data is speech encoded at a rate less than the full rate.

16. The method as claimed in claim 8, wherein said frame receiving steps include a step of forming mixed-mode frame structures which include signaling and/or secondary traffic information.

17. The method as claimed in claim 16, wherein it is necessary to adapt the next frame rate indication in anticipation of an overall frame data rate of the mixed mode frame structures.

18. The method as claimed in claim 16, wherein the frame quality indicators of the mixed-mode frame structures of information bits of the mixed-mode frame structures similar to conventional information bit frame structures, are exchanged for the next frame data rate indication.

19. The method as claimed in claim 16, wherein information bits of conventional frame structures are exchanged for the next frame data rate indication, and wherein the frame structures of the information bits of the mixed-mode frame structures change to maintain a consistent number of primary traffic bits.

20. A method of receiving fixed boundary data frames, including analyzing a selected frame of a series of fixed boundary data frames received in a synchronous system at variable rates, the method comprising steps of:

receiving a first frame at a known full data rate;

convolutionally decoding data of the first frame at the known full data rate;

analyzing decoded data of the first frame to determine a data rate of a next traffic channel frame, corresponding to a next frame of speech encoded data;

complete processing the first frame of data, including speech decoding;

receiving the next frame of coded data;

begin processing the next frame of coded data as a current frame of coded data, including convolutionally decoding the current frame of coded data at the previously determined data rate of said analyzing step;

responsive to the next data rate being a valid data rate choice, analyzing the current frame of data to determine a data rate of the next frame of coded data, and complete processing of the current frame of coded data, including speech decoding; and responsive to the next data rate not being a valid data rate choice, determining as current data rate, including convolutionally decoding at all rates other than the previously determined data rate of said analyzing step, and analyzing a correction version of the current frame of decoded data to determine a data rate of the next frame of decoded data.

21. The method as claimed in claim 20, wherein said receiving steps include a step of receiving mixed-mode frame structures which include signaling and/or secondary traffic information.

22. The method as claimed in claim 20, wherein the step of convolutionally decoding is replaced by a step of using an erasure bit for re-transmitting an erasure frame at the known full data rate which can then be processed at the known full data rate.

23. A method of forming fixed boundary data frames, including assembling a selected channel frame of a series of fixed boundary data frames transmitted in a synchronous system, the method comprising steps of:

receiving an indication of a first frame data rate;

begin assembling a preamble frame encoded at a known rate and combining with the first frame data rate indication;

computing and adding a first erasure/reserved bit, a first frame quality indicator, and first tail bits to a traffic channel frame to produce a traffic channel frame, and encoding and block interleaving the preamble traffic channel frame;

complete processing and output the preamble traffic channel frame including the first frame data rate indication;

receiving a current frame of speech encoded data;

receiving an indication of a next frame data rate;

begin assembling a current channel frame by combining the indication of the next frame data rate with the current frame of speech encoded data;

computing and adding a second erasure/reserved bit, a second frame quality indicator, and second tail bits to form the current traffic channel frame, and encoding and block interleaving the current traffic channel frame; and continue processing until the current traffic channel is completed and output for transmission.

24. A method for receiving fixed boundary data frames, including analyzing a selected frame of a series of fixed boundary data frames received in a synchronous system at variable rates, the method comprising steps of:

receiving a preamble frame at a known rate;

convolutionally decoding the preamble frame at the known rate;

analyzing decoded data to determine a data rate of a next frame of coded data;

receiving the next frame of coded data;

begin processing the next frame of coded data as a current frame of coded data, including convolutionally decoding the current frame of coded data at the previously determined data rate of said analyzing step;

responsive to the next data rate being a valid data rate choice, analyzing the current frame of data to determine a data rate of the next frame of coded data, and complete processing of the current frame of coded data, including speech decoding; and responsive to the next data rate not being a valid data rate choice, determining a current data rate, including convolutionally decoding at all rates other than the previously determined data rate of said analyzing step, and analyzing a correct version of the current frame of decoded data to determine a data rate of the next frame of decoded data.

25. The method as claimed in claim 24, wherein the next frame of coded data of said analyzing step is a first frame of coded data.

26. A method of forming fixed boundary data frames by speech encoding speech data in a synchronous system, performed in part by a vocoder and subject to commands of a central processing unit coupled to the vocoder, the method comprising steps of:

receiving pulse code modulated speech data;

begin speech encoding a current frame of data at an instructed data rate;

continue speech encoding the current frame until complete;

begin speech encoding a next frame of data including initially determining a data rate of the next frame of data; and outputting both an indication of the next frame data rate and the current speech encoded frame for further processing at the instructed data rate of the current frame.

27. The method as claimed in claim 26, wherein said outputting step include the step of outputting to the central processing unit one package of data per frame.

28. The method as claimed in claim 26, further comprising a step of transmitting the frames of data at periodic fixed rates to automatically reduce the potential for propagation of rate determination errors.

29. The method as claimed in claim 28, wherein said transmitting step includes a step of transmitting the frames of data at known rates according to periods known by a receiving station so that rate determination errors are addressed.

30. A method of forming fixed boundary data frames by speech encoding speech data in a synchronous system, performed in part by a vocoder and subject to commands of a central processing unit coupled to the vocoder, the method comprising steps of:

receiving a current frame of pulse code modulated speech data;

beginning speech encoding the current frame of data, including initially determining a data rate of the current frame of data;

receiving a next frame of pulse code modulated speech data;

begin speech encoding the next frame of data, including initially determining a data rate of the next frame of data;

outputting an indication of the next frame data rate and continuing speech encoding the current frame until complete;

outputting the current speech encoded frame of data for further processing at the data rate of the current frame.

31. The method as claimed in claim 30, wherein the next frame of speech encoded data is received in said next frame receiving step before the speech encoding processing on the first frame of data is complete.

32. The method as claimed in claim 30, wherein the vocoder processes multiple frame of data simultaneously in a parallel processing arrangement including said begin speech encoding steps, said outputting steps, and said continue speech encoding step.

33. The method as claimed in claim 30, wherein the vocoder is able to determine and output a data rate of the next frame of data before speech encoding is complete on the current frame of data.

34. The method as claimed in claim 30, wherein the next frame data rate is output before the current frame of speech encoded data.

35. The method as claimed in claim 30, further comprising a step of transmitting the frames of data at periodic fixed rates to automatically reduce the potential for propagation of rate determination errors.

36. The method as claimed in claim 30, wherein said transmitting step includes a step of transmitting the frames of data at known rates according to periods known by a receiving station so that rate determination errors are addressed.

37. A communication signal, embodied in a computer-readable medium, comprising:
   a first frame of data including data encoded at a first frame data rate; and
   a second frame of data subsequent to said first frame of data including data encoded at a second frame data rate, wherein said first frame of data includes an encoded indication of said second frame data rate that is functionally related to the computer-readable medium such that said second frame of data is decoded at the second frame data rate as a function of, and as instructed by the encoded indication.

38. The communication signal of claim 37, wherein said communication signal is embodied in a transmitter.

39. The communication signal of claim 37, wherein said communication signal is embodied in a cellular radio frequency signal.

40. The communication signal of claim 37, wherein said communication signal is embodied in a code division multiple access traffic channel signal.

41. The communication signal of claim 37, wherein said first frame of data and said second frame of data are fixed boundary synchronous data frames.

42. The communication signal of claim 37, wherein said first frame of data and said second frame of data are convolutionally encoded frames of data including speech data.

43. The communication signal of claim 37, wherein said first frame of data and said second frame of data are fixed boundary variable rate synchronous data frames.

* * * * *